US008310563B2

(12) United States Patent
Yamashita et al.

(10) Patent No.: US 8,310,563 B2
(45) Date of Patent: Nov. 13, 2012

(54) IMAGING APPARATUS, IMAGING METHOD, AND PROGRAM

(75) Inventors: Noriyuki Yamashita, Tokyo (JP); Toshifumi Fujita, Kanagawa (JP)

(73) Assignee: Sony Corporation, Tokyo (JP)

(*) Notice: Subject to any disclaimer, the term of this patent is extended or adjusted under 35 U.S.C. 154(b) by 252 days.

(21) Appl. No.: 12/630,975

(22) Filed: Dec. 4, 2009

(65) Prior Publication Data

US 2010/0141799 A1 Jun. 10, 2010

(30) Foreign Application Priority Data

Dec. 8, 2008 (JP) ................................. 2008-312705

(51) Int. Cl.
*H04N 5/262* (2006.01)
(52) U.S. Cl. .......................................... 348/239; 348/36
(58) Field of Classification Search ............. 348/208.11, 348/42, 36, 51, 344, 369, 218.1, 239
See application file for complete search history.

(56) References Cited

U.S. PATENT DOCUMENTS

| 2004/0017470 A1* | 1/2004 | Hama et al. ...................... 348/42 |
| 2005/0057662 A1* | 3/2005 | Washisu ..................... 348/208.99 |
| 2005/0237631 A1* | 10/2005 | Shioya et al. ................. 359/770 |
| 2008/0118155 A1* | 5/2008 | Yamashita ..................... 382/190 |
| 2008/0166115 A1* | 7/2008 | Sachs et al. ...................... 396/55 |
| 2009/0195639 A1* | 8/2009 | Toyoda et al. .................. 348/36 |
| 2010/0085422 A1* | 4/2010 | Yamashita et al. ............. 348/36 |
| 2010/0085442 A1* | 4/2010 | Yamashita et al. ......... 348/222.1 |
| 2010/0141735 A1* | 6/2010 | Yamashita et al. ............. 348/36 |
| 2010/0149368 A1* | 6/2010 | Yamashita et al. ......... 348/222.1 |

FOREIGN PATENT DOCUMENTS

| JP | 3925299 | 3/2007 |
| JP | 3928222 | 6/2007 |

* cited by examiner

*Primary Examiner* — Aung S Moe
(74) *Attorney, Agent, or Firm* — SNR Denton US LLP

(57) ABSTRACT

An imaging apparatus includes: an optical system having an optical axis changing element; an imaging device that images an object image through the optical system; an image signal processing section having a function of combining a plurality of imaged images into a combined image piece, the imaged images being obtained while the imaging apparatus is moved; and a controller that controls the optical axis changing element so that the optical axis is changed in a direction for negating the movement of the imaging apparatus, at least during periods when an electronic shutter of the imaging device is open, and that the optical axis returns to the vicinity of approximately the center of the movement of the imaging apparatus during periods when the electronic shutter is closed, wherein the controller performs the control of the optical axis with respect to a partial line in the central direction of the imaging device.

12 Claims, 22 Drawing Sheets

Peak

FIG.22A

| | | | | pi= | 3.1416 | rad= | 0.017 | | | | | | |
|---|---|---|---|---|---|---|---|---|---|---|---|---|---|
| | | in the case of 10M pixels | [1] Independent Variables (Input Data) | [2] Dependent variables (Output Data) | [3] Independent Variables | [3] Dependent variables | [4] Independent Variables | [4] Dependent variables | [5] Independent Variables | [5] Dependent variables | [6] Independent Variables | [6] Dependent variables | Calculation Formulas | Note |
| Horizontal angle of view | th [deg] | | 50 | | 50 | | 50 | | 50 | | 50 | | | |
| Horizontal pixel count | H [pixel] | | 3560 | | 3560 | | 3560 | | 3560 | | 3560 | | | |
| When horizontal angle of view and horizontal pixel count are determined, vertical angle of view and pixel density are obtained as follows. | | | | | | | | | | | | | | |
| Vertical angle of view | tv [deg] | | | 38.553 | | 38.553 | | 38.55 | | 38.55 | | 38.553 | 2 * atan(3/4 * tan(th/2)) | |
| Pixel density | d [pixel/deg] | | | 71.2 | | 71.2 | | 71.2 | | 71.2 | | 71.2 | H/th | |
| Vertical line count | n [line] | | 400 | | 400 | | 200 | | 100 | | 100 | | | |
| When vertical line count is determined, vertical angle of view total pixel count per one line are obtained as follows. | | | | | | | | | | | | | | |
| Vertical angle of view | ttv [deg] | | | 5.618 | | 5.618 | | 2.809 | | 1.4045 | | 1.4045 | n/d | Not accurate |
| Total pixel count per one piece | s [10000 pixel] | | | 142.4 | | 142.4 | | 71.2 | | 35.6 | | 35.6 | H * n /10000 | Not accurate |
| Memory capacity per one piece (BMP) | g1 [MB] | | | 4.272 | | 4.272 | | 2.136 | | 2.136 | | 1.068 | | 3 * s/100 |

FIG.22B

| | in the case of 10M pixels | | [1] Independent Variables (Input Data) | [2] Dependent variables (Output Data) | pi= 3.1416 [2] Independent Variables | [3] Dependent variables | rad= 0.017 [3] Independent Variables | [4] Dependent variables | [4] Independent Variables | [5] Dependent variables | [5] Independent Variables | [6] Dependent variables | [6] Independent Variables | Dependent variables | Calculation Formulas | Note |
|---|---|---|---|---|---|---|---|---|---|---|---|---|---|---|---|---|
| | | | | | | | | | | | | | | | | |
| | | | This image capturing device is rotated by 90° and images are captured while horizontally sweeping this device with the longer side thereof arranged vertically. | | | | | | | | | | | | | |
| Panning velocity | vp [deg/sec] | | 68 | | 21 | | 109 | | 24 | | 157 | | 26 | | | |
| Exposure period | ts [msec] | | 1 | | 10 | | 1 | | 10 | | 1 | | 10 | | | 1/1000 sec |
| | | | When panning velocity and exposure period are determined, blurring angle and blurring pixel count are obtained as follows. | | | | | | | | | | | | | |
| Blurring angle | ab [deg] | | 0.068 | 4.8416 | 0.21 | | | 0.109 | | | 0.24 | | | 0.157 | 0.26 | vp * ts /1000 | |
| Blurring pixel count | nb [pixel] | | | 4.8416 | | 14.952 | | 7.761 | | 17.09 | | 11.178 | | 18.512 | ab * d | Correctable |
| Overlapping ratio | k [%] | | 20 | | 20 | | 30 | | 30 | | 40 | | 40 | | | |

FIG.22C

| | | | [1] | [2] | [3] | [4] | [5] | [6] | | |
|---|---|---|---|---|---|---|---|---|---|---|
| | | in the case of 10M pixels | Independent Variables (Input Data) | Dependent variables (Output Data) | Independent variables | Dependent variables | Independent Variables | Dependent variables | Independent variables | Dependent variables | Calculation Formulas | Note |
| | | | pi= | 3.1416 | | rad= | 0.017 | | | |
| When overlapping ratio is determined, one-screen shift time and frame rate are obtained as follows. | | | | | | | | | | |
| One-screen shift time | T [sec] | | | 0.0661 | 0.214 | 0.018 | 0.082 | | 0.0054 | | 0.0324 | (100-k)/100 * ttv/vp |
| Frame rate | f [fps] | | | 15.13 | 4.6725 | 55.43 | 12.21 | | 186.31 | | 30.853 | 1/T |
| Horizontal line count | nx | | 27 | 27 | 27 | 61 | 142 | | 142 | | | |
| Buffer memory capacity | g2 [MB] | | | 115.34 | 115.34 | 130.3 | 130.3 | | 151.66 | | 151.66 | g1 * nx |
| When horizontal line count is determined, horizontal range, capturing period, horizontal pixel count, and total pixel count are obtained as follows. | | | | | | | | | | |
| Horizontal range | w [deg] | | | 122.47 | 122.47 | 120.8 | 120.8 | | 120.22 | | 120.22 | ((100-k)/100 * (nx-1)+1) * ttv |
| Capturing period | tx [sec] | | | 1.7845 | 5.7785 | 1.1 | 4.998 | | 0.7622 | | 4.6024 | nx * T |
| Horizontal pixel count | px [pixel] | | | 8720 | 8720 | 8600 | 8600 | | 8560 | | 8560 | w * d |
| Total pixel count | M [10000 pixel] | | | 3104.3 | 3104.3 | 3062 | 3062 | | 3047.4 | | 3047.4 | H * px/ 10000 |

FIG.22D

| | | | [1] | [2] | pi= | 3.1416 | rad= | 0.017 | | | | | |
|---|---|---|---|---|---|---|---|---|---|---|---|---|---|
| | | | | | | [3] | [4] | | [5] | | [6] | | |
| | | in the case of 10M pixels | Independent Variables (Input Data) | Dependent variables (Output Data) | Independent Variables | Dependent variables | Independent Variables | Dependent variables | Independent Variables | Dependent variables | Independent Variables | Dependent variables | Calculation Formulas | Note |
| Readout speed | rs [μsec/line] | | 7.803 | | 7.803 | | 7.803 | | 7.803 | | 7.803 | | | |
| When readout speed is determined, readout period is obtained as follows. | | | | | | | | | | | | | | |
| Readout period | tr [msec] | | | 3.1212 | | 3.1212 | | 1.561 | | 1.561 | | 0.7803 | 0.7803 | n * rs |
| Sum of readout period and exposure period corresponds to pirouette time. | | | | | | | | | | | | | | |
| Pirouette time | tp [msec] | | | 4.1212 | | 13.121 | | 2.561 | | 11.56 | | 1.7803 | 10.78 | ts+tr |
| Blurring angle and blurring pixel count during this period are calculated as follows. | | | | | | | | | | | | | | |
| Blurring angle | ab2 [deg] | | | 0.2802 | | 0.2755 | | 0.279 | | 0.277 | | 0.2795 | 0.2803 | vp * tp /1000 | Allowable if not more than 0.3 |
| Blurring pixel count | nb2 [pixel] | | | 19.953 | | 19.619 | | 19.87 | | 19.75 | | 19.901 | 19.956 | ab2 * d | Allowable if not more than 20 |

IMAGING APPARATUS, IMAGING METHOD, AND PROGRAM

BACKGROUND OF THE INVENTION

1. Field of the Invention

The present invention relates to an imaging apparatus having a function of combining a plurality of images together, and to an imaging method and a program thereof.

2. Description of the Related Art

In panoramic photography using a camcorder (a camera built in VTR), a digital camera, or the like, when shooting panoramic images while stopping the sweeping motion of the camera at each stage or having a continuous sweeping motion, it is necessary to sweep the camera at a low speed in order to prevent blurring the resulting images.

In the latter case, the shooting may require a high-speed shutter.

In regards to this, Japanese Patent No. 3928222 (Patent Document 1) proposes a shooting method that enables fast sweeping of a camera while maintaining an image resolution.

The technique used in this shooting method is a technique that enables a camera to shoot images as if it is focusing on one point by detecting a sweeping direction of the camera and an angular velocity of the sweeping and changing the optical axis at the same angular velocity in a reverse direction of the sweeping, thereby negating a change in a resulting image.

Although it is necessary to use an acceleration sensor or an angular acceleration sensor in order to implement the control method, Japanese Patent No. 3925299 (Patent Document 2) proposes a method that enables appropriately to control the optical axis even when the sensors and a feedback circuit for controlling them are not provided.

In this case, the method is used as a monitoring system, in which the number of pulses applied to a stepping motor used for controlling a shooting direction is counted and an optical axis control is performed in accordance with the counted value.

SUMMARY OF THE INVENTION

However, both of the above-described techniques use a CCD (charge coupled device) as an imaging unit of the camera.

When a CMOS image sensor (CIS) is used as the imaging unit, the exposure times differ from line to line. When images are shot while sweeping the camera, the upper ends and the lower ends of the images are misaligned relative to each other, so a distorted image is obtained.

Moreover, when images are shot while sweeping the camera, a same object may appear different due to influence of parallax.

Thus, it is desirable to provide an imaging apparatus capable of suppressing the occurrence of an image distortion and suppressing the influence of parallax, and an imaging method and a program thereof.

In accordance with a first embodiment of the present invention, there is provided an imaging apparatus including an optical system having an optical axis changing element that is capable of changing an optical axis thereof; an imaging device that images an object image through the optical system; an image signal processing section having a function of combining a plurality of imaged images into a combined image piece, the imaged images being obtained while the imaging apparatus is moved; and a controller that controls the optical axis changing element so that the optical axis is changed in a direction for negating the movement of the imaging apparatus at least during periods when an electronic shutter of the imaging device is open, and that the optical axis returns to the vicinity of approximately the center of the movement of the imaging apparatus during periods when the electronic shutter is closed, wherein the controller performs the control of the optical axis of the optical axis changing element with respect to a partial line in the central direction of the imaging device.

Preferably, a shooting direction is perpendicular to the line of the imaging device.

Preferably, the controller performs the optical axis control during a period which corresponds to the sum of an exposure period and a readout period of the partial line and performs the control for returning the optical axis to the vicinity of the center during periods other than the corresponding period.

Preferably, the controller segments a portion of the imaging device into a strip shape and performs the optical axis control with respect to the strip-shaped portions; the imaging device performs a charge readout process with respect to all the strip-shaped portions, where the charge readout is performed in the line subsequently to exposure and a charge readout of a subsequent line is performed after the readout of the line is completed; and, the controller performs the optical axis control during periods when the charge readout process is performed with respect to all the strip-shaped portions.

Preferably, the imaging apparatus further includes an angular velocity sensor, and the controller integrates a detection signal to calculate a rotation angle of the imaging apparatus and controls an amount of change in the optical axis of the optical axis changing element in accordance with the calculated rotation angle.

Preferably, the image signal processing section extracts a certain parameter by performing block matching processes at boundaries of a plurality of selected images to perform combining processes with respect to the boundaries so that the boundaries of the selected images are disposed in an overlapping relationship; performs the block matching processes with respect to all boundaries to be combined based on the parameter; evaluates the results of the block matching processes with respect to all the boundaries in a simultaneous and parallel manner; and performs the combining processes to reduce errors by updating an optical axis direction so as to reduce errors in all the boundaries.

In accordance with a second embodiment of the present invention, there is provided an imaging method including the steps of: imaging an object image using an imaging device through an optical system having an optical axis changing element that is capable of changing an optical axis thereof while moving the imaging apparatus; controlling the optical axis changing element so that the optical axis is changed in a direction for negating the movement of the imaging apparatus at least during periods when an electronic shutter of the imaging apparatus is open; and controlling the optical axis changing element so that the optical axis returns to the vicinity of approximately the center of the movement of the imaging apparatus during periods when the electronic shutter is closed, wherein the control of the optical axis of the optical axis changing element is performed with respect to a partial line in the central direction of the imaging device.

In accordance with a third embodiment of the present invention, there is provided a program for performing an imaging process, the program causing a computer to execute: a process of imaging an object image using an imaging device through an optical system having an optical axis changing element that is capable of changing an optical axis thereof while moving the imaging apparatus; a process of controlling the optical axis changing element so that the optical axis is changed in a direction for negating the movement of the imaging apparatus at least during periods when an electronic shutter of the imaging apparatus is open; and a process of controlling the optical axis changing element so that the optical axis returns to the vicinity of approximately the center of the movement of the imaging apparatus during periods when the electronic shutter is closed, wherein the control of the optical axis of the optical axis changing element is performed with respect to a partial line in the central direction of the imaging device.

In accordance with the embodiments of the present invention, the control of the optical axis of the optical axis changing element is performed with respect to the partial line in the central direction of the imaging device by the controller.

Therefore, in accordance with the embodiments of the present invention, it is possible to suppress the occurrence of an image distortion and suppress the influence of parallax.

BRIEF DESCRIPTION OF THE DRAWINGS

FIGS. 22A to 22D are diagrams for explaining an example of processing for calculating a sweeping velocity.

DESCRIPTION OF PREFERRED EMBODIMENTS

Embodiments of the present invention will be described with reference to the accompanying drawings.

Figure 1:
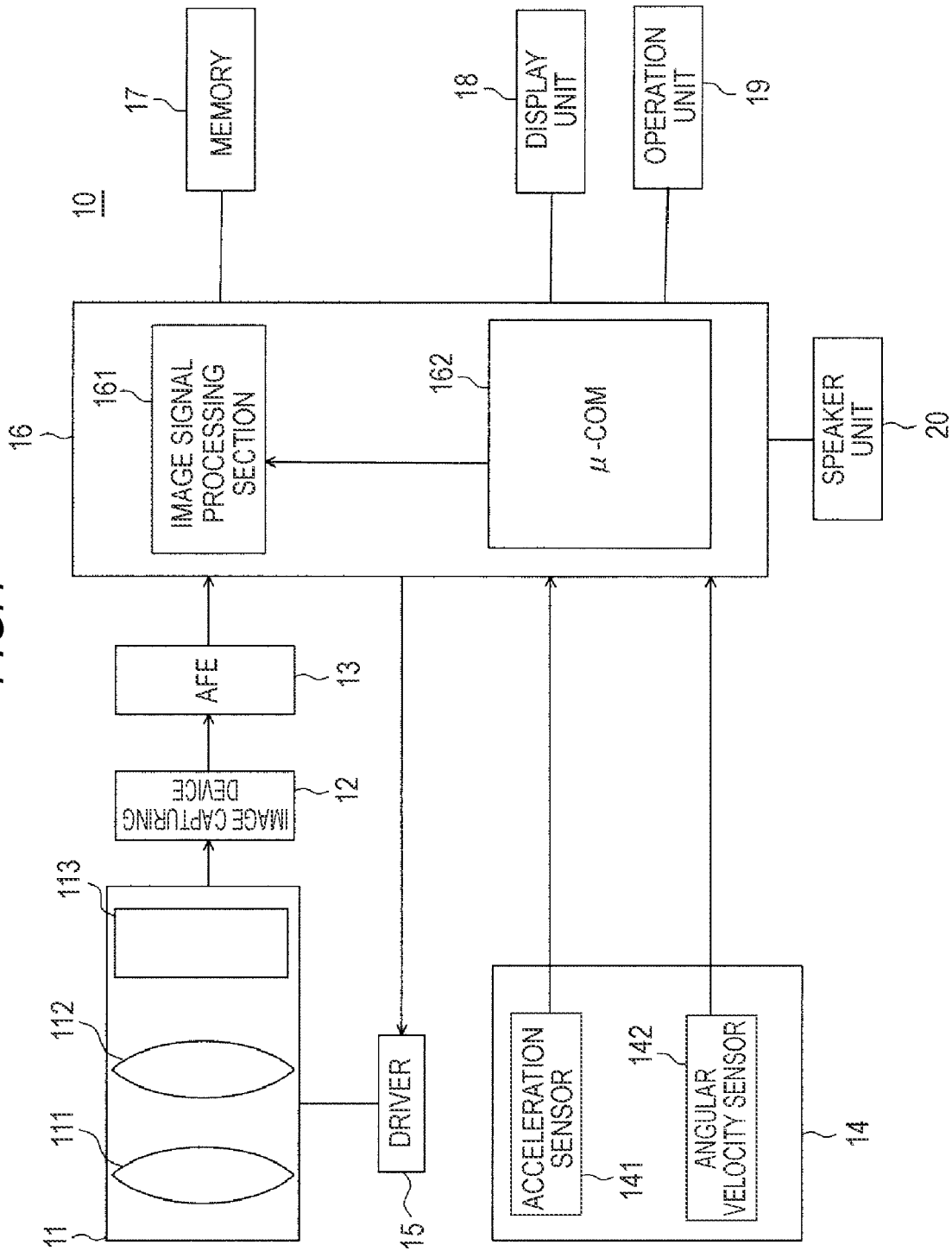
FIG. 1 is a block diagram showing an example of the configuration of a camera apparatus employing an image processing apparatus according to an embodiment of the present invention.

FIG. 1 is a block diagram showing an example of the configuration of a camera apparatus as an imaging apparatus according to an embodiment of the present invention.

Figure 2:
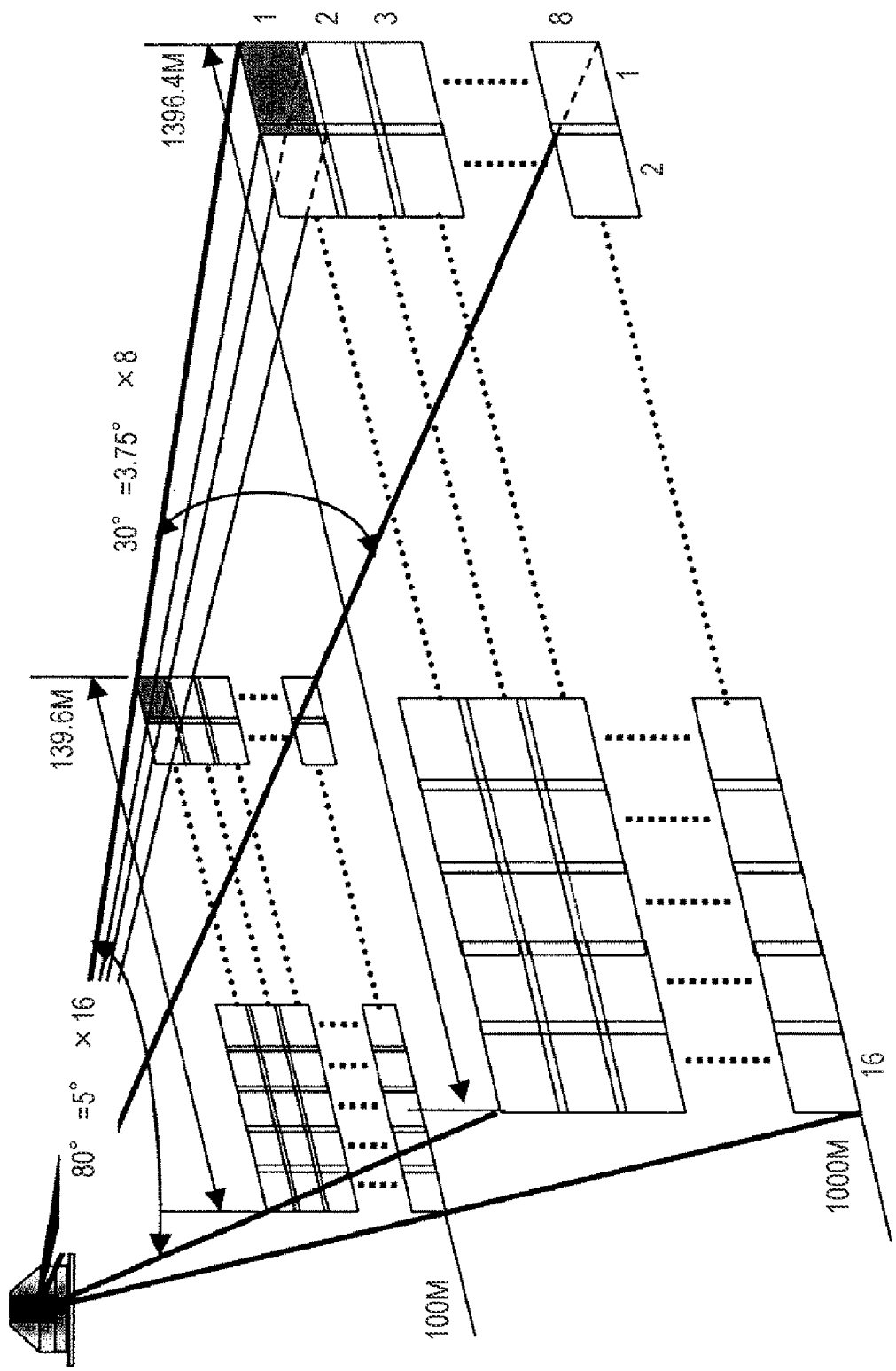
FIG. 2 is a diagram conceptually showing the case of performing a wide-angle imaging by the camera apparatus according to the embodiment.

As shown in FIG. 2, a camera apparatus 10 of the present embodiment is configured to obtain a large number of images (16×8=128 pieces in FIG. 2) by automatically or manually imaging a plurality of times in different directions from a point.

The camera apparatus 10 is configured to combine a large number of, e.g., several thousands of, images precisely without wrinkles to form a so-called panoramic image.

That is to say, the camera apparatus 10 has a function of creating a panoramic image from images imaged by a digital camera which mounts thereon a solid-state imaging device, e.g., a CMOS image sensor (CIS), and which is vertically or horizontally swept at a high speed.

The camera apparatus 10 according to the present embodiment has the first to fifth characteristic configurations and functions below.

The first configuration will be described.

When a panoramic image is generated by imaging a plurality of images while moving the camera apparatus 10 and then combining the imaged images together, the optical axis of a lens (a shift lens) focusing the image is controlled so as to negate the moving direction of the camera and the angular velocity thereof.

In this way, the camera which is being moved can shoot images as if it is focusing on one point.

In this configuration, a CIS (CMOS Image Sensor) is used as the solid-state imaging device, and the images are imaged by performing the above-mentioned with respect to a partial line in the central direction of the CIS.

That is to say, the optical axis control is performed during a period which corresponds to the sum of an exposure period and a readout period of the partial line, and during periods other than the corresponding period, the optical axis is controlled to be returned to the vicinity of the center. The shooting direction of the camera at that time is perpendicular to the line of the CIS.

The camera apparatus 10 segments a portion of the CIS into a strip shape and performs the optical axis control with respect to the strip-shaped portions, thereby generating a panoramic image at a high frame rate without reducing the resolution even when the camera is moved at a high speed.

The second configuration will be described.

The camera apparatus 10 employs a technique that spatially arranges the continuously imaged images using the frame shift information obtained via an image recognition technique and the shift information obtained from a position sensor.

Portions of which the information is not obtainable through this image recognition are replaced with the position sensor information, and the position sensor information is used as auxiliary coordinates for confirmation of the success in the image recognition or to be used when the image recognition has failed. The images that are spatially arranged are combined into one panoramic image.

In this case, the camera apparatus 10 is configured as a camera that images a plurality of images in a state of being mainly held by hands, by imaging a plurality of times in different directions from approximately one point.

The camera apparatus 10 includes a position sensor that has both or either one of a three-axis (or two-axis) acceleration sensor and a three (or two-axis) angular velocity sensor.

The camera apparatus 10 has a function of recording the position information regarding the shooting direction in which the respective images are imaged simultaneously with the imaging and combining the plurality of imaged images into a piece of image in situ.

The camera apparatus 10 calculates the relative positional relationship of the images using an overlapping region of the images with the aid of an image recognition function such as block matching and calculates the positional relationship of the images based on various position sensor data.

Then, the camera apparatus 10 calculates more precise relative positional relationship of the image via selective collaboration of the calculated relative positional relationship and the positional relationship of the images.

Thereafter, the camera apparatus 10 specifies the absolute positional relationship of the respective images, related to orientations of the centers of the respective images, such as, for example, a panning angle (longitude), a tilting angle (altitude), and a rolling angle (inclination) around the optical axis and performs precise automated combining using them as initial values.

The third configuration will be described.

The camera apparatus 10 employs a technique that records continuously imaged images by correlating frame shift information obtained via a technique of image recognition and the shift information obtained from a position sensor with each other.

The camera apparatus 10 calculates information, e.g., a pixel view angle of an image, a static-state value of a position sensor, and a corresponding pixel view angle of the position sensor value, which is indefinite on its own. The camera apparatus 10 has parameters, e.g., offsets and gains and thus is able to make the information substantially identical to the actual direction by changing the parameters.

The camera apparatus 10 statically detects static-state position data by an angle of a three-axis (or two-axis) acceleration sensor with respect to the direction of gravity and uses the position data as the initial values of the position information.

The camera apparatus 10 mainly calculates rotational movement in the vertical and horizontal directions of the camera by the time-integration values of a three-axis angular velocity sensor, for example, and uses the rotational movement as the direction data at the time when the respective images are imaged.

The camera apparatus 10 calculates relative positional relationship of the images using an overlapping region of the images with the aid of an image recognition function such as block matching. The camera apparatus 10 simultaneously makes a determination as to whether or not the calculation results are correct and calculates the positional relationship of the images.

When the calculation results are correct, the camera apparatus 10 corrects the parameters based on this information of the positional relationship.

When the calculation results are not correct, the camera apparatus 10 arranges the images using the position sensor values obtained based on parameters which have already been corrected.

The fourth configuration will be described.

The camera apparatus 10 has a function of outputting a warning signal to prompt users to reshoot upon detecting an influence of a moving object.

In regard to the detection of the moving object, the camera apparatus 10 has a function of ensuring any portion of an object will appear in at least two pieces of images with an overlapping ratio of 50% or more to detect the influence of parallax or the object with the aid of the similarity matching of a motion vector between adjacent images.

That is to say, the camera apparatus 10 outputs a warning signal to prompt users to reshoot upon detecting the moving object or the influence of parallax.

In the camera apparatus 10 that images a plurality of strip-shaped images of a wide-range object with a single sweep and combines them into one image, it is detected how much influence of parallax an object in a close range is receiving, and users are prompted to reshoot the object around the viewpoint of the camera based on the detection results.

The fifth configuration will be described.

The camera apparatus 10 prompts users to reshoot by informing the users of an appropriate value of the sweeping angular velocity (the speed at which the user sweeps the camera) and outputting a warning signal if the sweeping is too fast.

The camera apparatus 10 graphically displays time and output (sweeping angular velocity) of a position sensor (gyro sensor), respectively, on the horizontal and vertical axes of a screen of a display unit 18, e.g., an LCD. Since the maximum sweeping angular velocity is determined when a horizontal angle of view, a horizontal pixel number, and a shutter speed are set, 60 to 80% of the maximum sweeping angular velocity is displayed on the graph as an appropriate range.

More detailed configuration and function of the camera apparatus 10 having the above-described features will be described below.

The camera apparatus 10 is configured to include an optical system 11, an imaging device 12, an analog front-end (AFE) circuit 13, a position sensor unit 14, a driver 15, a system controller 16, a memory 17, a display unit 18, an operation unit 19, and a speaker unit 20.

The optical system 11 focuses an object image onto an imaging plane of the imaging device 12.

The optical system 11 is configured to include a normal lens 111, a shift lens 112 as an optical axis changing element, and a mechanical shutter 113.

The shift lens 112 has a function of changing an optical axis direction by the driving of the driver 15 in addition to the function of focusing an image.

The imaging device 12 is configured by, for example, a CMOS (complimentary metal oxide semiconductor) device or a CCD (charge coupled device).

In the present embodiment, a CMOS image sensor will be described as an example. In the above-described first configuration, a CMOS image sensor is used as the solid-state imaging device.

The imaging device 12 detects the object image obtained by the optical system 11 by means of optical sensors arranged in a matrix on a semiconductor substrate to generate a signal charge, reads the signal charge through a vertical signal line and a horizontal signal line, and then outputs the image signal of the object.

When the imaging device 12 is formed by a CMOS image sensor, an exposure control is performed by a global shutter and a rolling shutter which is an electronic shutter. The exposure control is performed by the system controller 16.

The AFE circuit 13 removes, for example, a fixed pattern noise contained in the image signal from the imaging device 12, stabilizes the signal level by the operation of automated gain control, and outputs the resulting image signal to the system controller 16.

The position sensor 14 detects the position of the camera apparatus 10 to supply the detection results to the system controller 16.

The position sensor 14 is configured by a three-axis acceleration sensor 141 and a three-axis angular velocity sensor 142, for example.

The acceleration sensor 141 is able to statically know an angle thereof with respect to the direction of gravity and thus to detect a tilting angle and a rolling angle. However, the acceleration sensor 141 cannot detect a panning angle.

Therefore, the angular velocity sensor 142 is used for obtaining a shift angle. The angular velocity sensor 142 is also referred to as a gyro sensor and is able to detect an angular velocity during rotation as a voltage signal and calculate the angle by integrating the voltage signal. Moreover, since the angular velocity sensor 142 is configured as a three-axis sensor, it can detect a panning angle, a tilting angle, and a rolling angle.

The driver 15 changes the optical axis of the shift lens 112 of the optical system 11 under the control of the system controller 16.

The system controller 16 is a circuit for performing color correction processing, combining processing of a plurality of images, automated exposure control and auto white balance control etc, with respect to output signals from the AFE circuit 13.

The system controller 16 is configured to include an image signal processing section 161 and a microcomputer (μ-CON) 162 as a controller.

The image signal processing section 161 has a precise combining processing unit which is configured to enable precise combining, without wrinkles, of a large number of images taken a plurality of times in different directions from a point.

Figure 3:
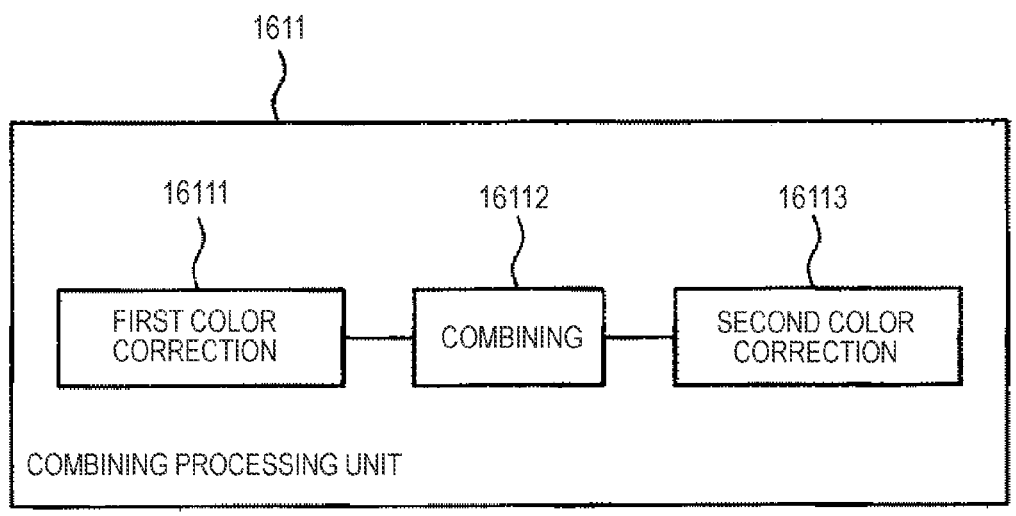
FIG. 3 is a block diagram of a precise combining processing unit.

As shown in FIG. 3, a precise combining processing unit 1611 includes a first color correction functioning section 16111, a combining functioning unit 16112, and a second color correction functioning unit 16113.

The image signal processing section 161 combines a plurality of imaged images together, the images being obtained while moving the camera apparatus 10 to generate a panoramic image.

The microcomputer 162 controls the optical axis of the lens (shift lens) that focuses an image so as to negate the moving direction of the camera and the angular velocity in accordance with the detection results of the position sensor 14.

When a CMOS image sensor is used as the solid-state imaging device, the microcomputer 162 controls the driver 15 to perform the above-mentioned optical axis control during a period which corresponds to the sum of an exposure period and a readout period of a partial line of the CMOS image sensor and to return the optical axis to the vicinity of the center during periods other than the corresponding period. The shooting direction of the camera at that time is perpendicular to the line of the CMOS image sensor.

The microcomputer 162 segments a portion of the CMOS image sensor into a strip shape and perform the optical axis control with respect to the strip-shaped portions, so that a panoramic image is generated at a high frame rate without reducing the resolution even when the camera is moved at a high speed.

The microcomputer 162 integrates the detection signal of the angular velocity sensor 142 to calculate a rotation angle of the camera apparatus 10 and controls the amount of change in the optical axis of the shift lens 112 in accordance with the calculated rotation angle.

Alternatively, the image signal processing section 161 may detect the motion component of adjacent imaged images, and the microcomputer 162 may control the amount of change in the optical axis in accordance with the detected motion component.

Alternatively, the microcomputer 162 may control the amount of change in the optical axis based on the calculated rotation angle and the motion component.

The microcomputer 162 records the position information in the memory 17, regarding the shooting direction in which the respective imaged images are imaged.

The image signal processing section 161 and the microcomputer 162 calculate the relative positional relationship of the respective images using an overlapping region of the images with the aid of an image recognition function such as block matching and calculate the positional relationship of the images based on various position sensor data.

Then, the microcomputer 162 calculates more precise relative positional relationship of the image via selective collaboration of the calculated relative positional relationship and the positional relationship of the images.

Thereafter, the microcomputer 162 specifies the absolute positional relationship of the respective images, related to orientations of the centers of the respective images, such as, for example, a panning angle (longitude), a tilting angle (altitude), and a rolling angle (inclination) around the optical axis.

The image signal processing section 161 performs precise automated combining using them as initial values.

The microcomputer 162 calculates information, e.g., a pixel view angle of an image, a static-state value of a position sensor, and a corresponding pixel view angle of the position sensor value, which is indefinite on its own. The microcomputer 162 has parameters, e.g., offsets and gains and is thus able to make the information substantially identical to the actual direction by changing the parameters.

The microcomputer 162 statically detects static-state position data by an angle of a three-axis (or two-axis) acceleration sensor with respect to the direction of gravity and uses the position data as the initial values of position information.

The microcomputer 162 mainly calculates rotational movement in the vertical and horizontal directions of the camera by the time-integration values of a three-axis angular velocity sensor 142, for example, and uses the rotational movement as the direction data at the time when the respective images are imaged.

The microcomputer 162 calculates relative positional relationship of the images using an overlapping region of the images with the aid of an image recognition function such as block matching and also makes a determination as to whether or not the calculation results are correct simultaneously when calculating the positional relationship of the images.

When the calculation results are correct, the microcomputer 162 corrects the parameters based on this information of the positional relationship.

When the calculation results are not correct, the microcomputer 162 arranges the images using the position sensor values obtained based on parameters which have already been corrected.

The microcomputer 162 outputs a warning signal by displaying an indication and/or outputting a warning sound by means of the display unit 18 and/or the speaker unit 20 to prompt users to reshoot upon detecting an influence of a moving object.

In regard to detection of the moving object, the microcomputer 162 ensures any portion of an object will appear in at least two pieces of images with an overlapping ratio of 50% or more to detect the influence of parallax or the object with the aid of the similarity matching of a motion vector between adjacent images.

That is to say, the microcomputer 162 outputs a warning signal to prompt users to reshoot upon detecting the object or the influence of parallax.

The microcomputer 162 detects how much the influence of parallax an object in a close range is receiving to prompt users to reshoot the object around the viewpoint of the camera based on the detection results.

The microcomputer 162 prompts users to reshoot by informing the users of an appropriate value of the sweeping angular velocity (the speed at which the user sweeps the camera) and outputting a warning signal by displaying an indication and/or outputting a warning sound by means of the display unit 18 and/or the speaker unit 20 if the sweeping is too fast.

The microcomputer 162 graphically displays time and output (sweeping angular velocity) of a position sensor (gyro sensor), respectively, on the horizontal and vertical axes of a screen of the display unit 18, e.g., an LCD. Since the maximum sweeping angular velocity is determined when a horizontal angle of view, a horizontal pixel number, and a shutter speed are set, 60 to 80% of the maximum sweeping angular velocity is displayed on the graph as an appropriate range RNG, as shown in FIG. 4.

Figure 4:
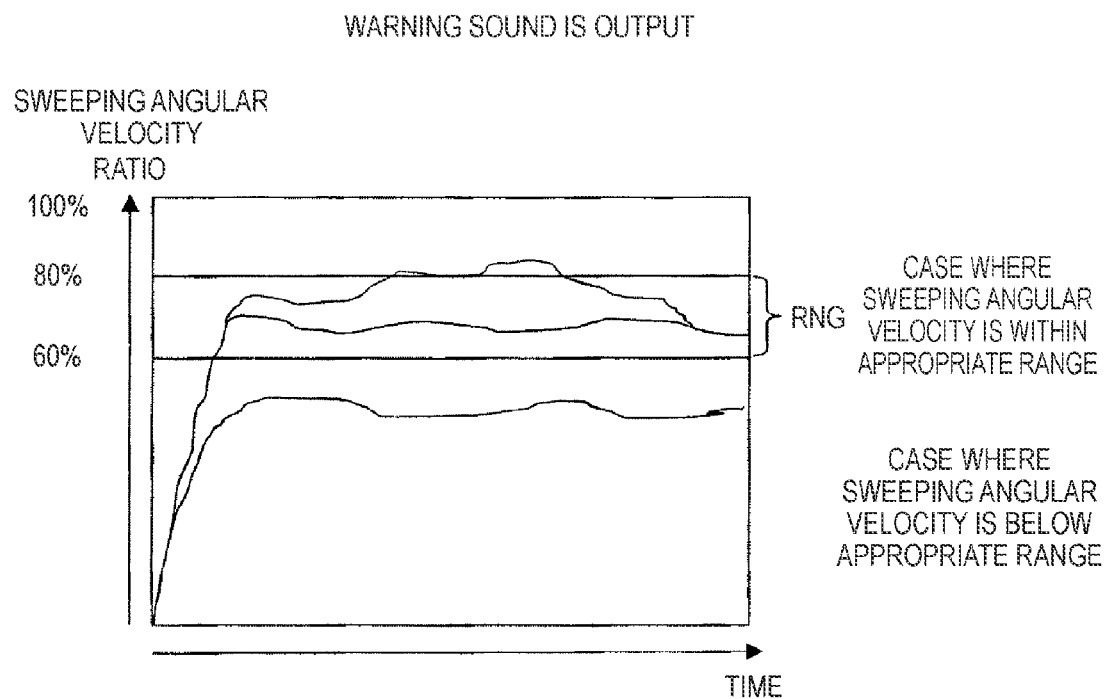
FIG. 4 is a diagram graphically showing the output (sweeping angular velocity) of a position sensor.

An overview of the operation procedures is as follows.
[1] The camera is swept with the pressed start button of the operation unit 19 and then the start button is released.
[2] The sweeping angular velocity during the pressed state of the start button is displayed on the screen of the display unit 18 as illustrated in FIG. 4.
[3] The warning signal is not output when the sweeping angular velocity is lower than the appropriate range RNG, but will be output when the sweeping angular velocity is higher than the appropriate range.

Hereinafter, the above-described first to fifth configurations will be described in detail.

The controls in the first to fifth configurations are mainly performed by the system controller 16.
[First Configuration]

In the first configuration, since the CMOS image sensor is used as the solid-state imaging device, there are no such concepts as frames/fields, and a progressive method is employed in which all lines are sequentially read out.

Figure 5A:
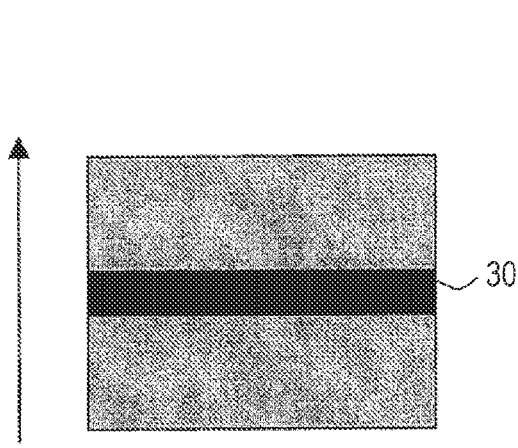
FIGS. 5A and 5B are diagrams for explaining an imaging mode according to the first configuration of the present embodiment.
Figure 5B:
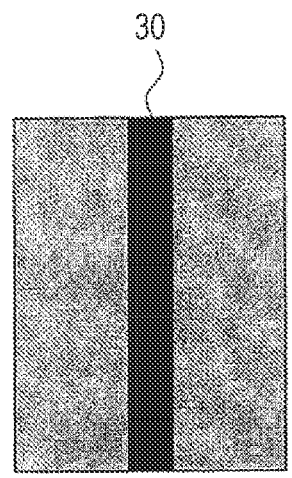

FIGS. 5A and 5B are diagrams for explaining an imaging mode according to the first configuration of the present embodiment.

As a method of moving the camera apparatus 10, it is assumed that the camera is basically swept in the vertical direction as shown in FIG. 5A or in the horizontal direction as shown in FIG. 5B. That is to say, the camera is moved in a direction perpendicular to the readout line of the CMOS image sensor.

As depicted by a dark strip-shaped portion 30 in FIGS. 5A and 5B, in the present embodiment, the microcomputer 162 performs the optical axis control with respect to a strip-shaped portion which is segmented from the central portion of the imaging range of the CMOS image sensor.

Such a strip imaging gives the following advantages.
(a) The narrower strip gives more advantageous influence on the parallax.
(b) The narrower strip gives more advantageous influence on the asynchronous readout of the CMOS image sensor.
(c) The narrower strip gives more advantageous influence on the ambient light reduction.
(d) The narrower strip gives more advantageous influence on the lens distortion.

The microcomputer 162 controls the optical axis of the lens (shift lens) that focuses an image so as to negate the moving direction of the camera and the angular velocity in accordance with the detection results of the position sensor 14.

When a CMOS image sensor is used as the solid-state imaging device, the microcomputer 162 controls the driver 15 to perform the above-mentioned optical axis control during a period which corresponds to the sum of an exposure period and a readout period of a partial line of the CMOS image sensor and to return the optical axis to the vicinity of the center during periods other than the corresponding period.

That is to say, the optical axis control needs to be performed during a period when the strip-shaped portion 30 as shown in FIGS. 5A and 5B is being exposed.

Figure 6:
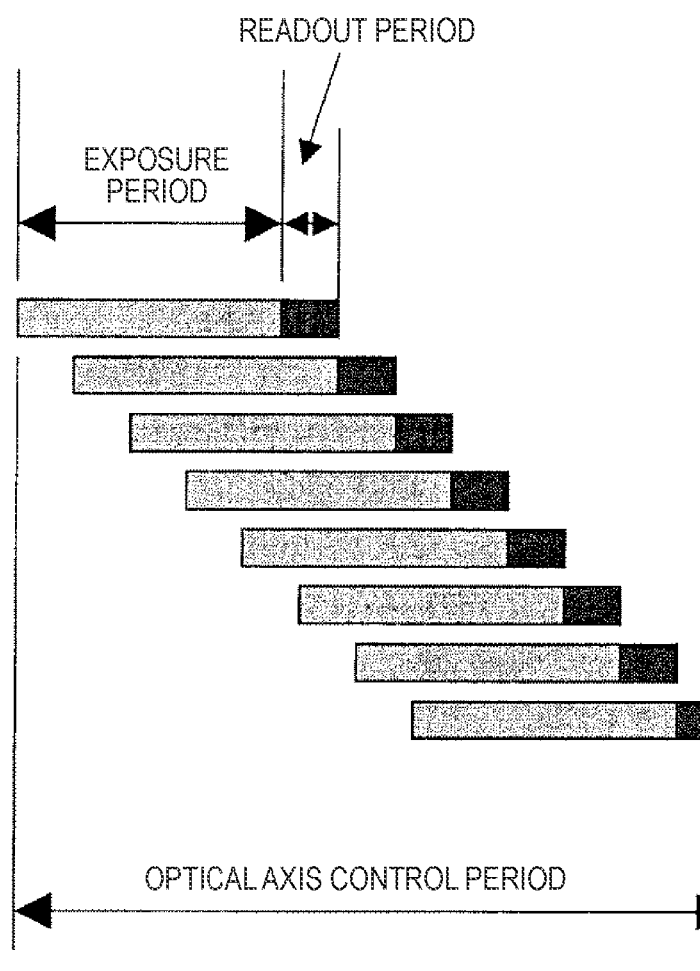
FIG. 6 is a diagram showing the relationship between an exposure period of a CMOS image sensor, a readout period of stored charges, and an optical axis control period.

FIG. 6 is a diagram showing the relationship between an exposure period of a CMOS image sensor, a readout period of stored charges, and an optical axis control period.

Charges are readout of respective lines of the CMOS image sensor subsequently to exposure, and exposure, and the charge readout and exposure are performed with respect to the subsequent line after the charge readout of a certain line is completed. The optical axis control is performed during a period when this operation is repeatedly performed so that the charge readout process is performed for all the strip-shaped portions.

For example, when a CMOS image sensor of which the readout period per one line is 7.8 μsec/line is used, a shutter speed is 1/1000 sec (namely, the exposure period is 1 msec), and the strip width is 200 lines, the total readout period becomes 1.56 msec and the optical axis control period becomes 2.56 msec in FIG. 6. This corresponds to the condition [3] in FIGS. 22A to 22D in which the blurring pixel count or the frame rate is calculated when various parameters are given. In addition, when the frame rate of an imaging is 60 fps (about 16.66 msec per one image), by applying the corresponding numeric values in FIG. 3 of Patent Document 1, Son becomes 2.56 msec and Soff becomes 14.1 msec (=16.66−2.56).

Although an allowable limit angle of the optical axis control was in the range of ±1.2 degrees in the technique disclosed in Patent Document 1, the allowable limit angle is variable within the range of ±0.5 degrees and a value in the range of 0 to 0.3 degrees is used. This corresponds to about 60% of the maximum variable range.

The strip-shaped images obtained by imaging in such a manner are combined together by the precise combining processing unit 1611 in FIG. 3, whereby a panoramic image is generated. Hereinafter, an image combining process of the precise combining processing unit 1611 will be described.

Thus, the system controller 16 according to the present embodiment has a function (e.g., software) by which the images taken a plurality of times indifferent directions from a point can be precisely combined into a piece of image by correcting color non-uniformity.

The characteristic functions of the precise combining of the present embodiment will be described in detail below.

The first color correction functioning unit 16111 performs at least three blocks matching (BM) processes for each boundary when extracting a parameter such as a lens distortion correction coefficient, and performs combining with respect to boundaries in at least four pieces, thereby determining the lens distortion correction coefficient to permit precise combining.

In other words, the first color correction functioning unit 16111 extracts a parameter such as a lens distortion correction coefficient from an original image.

Subsequently, the first color correction functioning section 16111 uniformly performs ambient light reduction correction, contrast enhancement, saturation enhancement and gamma correction with respect to all partial images.

After the first color correction functioning unit 16111 determines the parameter such as the lens distortion correction coefficient and performs ambient light reduction correction, contrast enhancement, saturation enhancement and gamma correction, the combining functioning unit 16112 performs BM at least one (e.g., three) for each of all boundaries.

Then, the combining functioning unit 16112 performs precise combining of a plurality of images by simultaneously evaluating the results of the BM for all the boundaries, and updating the optical axis direction so as to reduce the errors in all the boundaries.

The second color correction functioning section 16113 performs color (color non-uniformity) correction, which is performed independently for each partial image in order to reduce the color difference between adjacent images in the plurality of images precisely combined by the combining functioning unit 16112.

The second color correction functioning section 16113 also performs color correction for reducing the color discontinuity between adjacent images to be below a detection limit.

The theoretical concept of the precise combining process in the precise combining processing unit 1611 will be described below.

The present embodiment basically employs a phase correlation technique based on Fourier analysis.

That is, the employed technique is based on Fourier shift theorem that the shift of a spatial function is changed only in the phase of a spectrum region.

Specifically, two functions $f_1$ and $f_2$ should satisfy the following relationship.

$$f_2(x,y)=f_1(x+x_t, y+y_t)$$ [Equation 1]

Further there is the following spectrum characteristic.

$$F_2(u,v)=F_1(u,v)\exp(-2\pi i(ux_t+vy_t))$$ [Equation 2]

The above equation can be equivalently written by using cross-power spectrum (CPS), as follows.

$$\frac{F_1(u,v)F_2^*(u,v)}{|F_1(u,v)F_2^*(u,v)|} = \exp(2\pi i(ux_t+vy_t)),$$ [Equation 3]

Cross–power spectrum

In the equation, $F_2^*$ is a conjugate function of a complex function $F_2$.

Figure 7A:
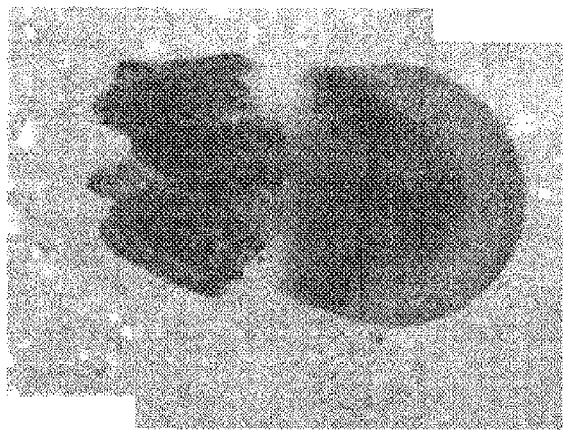
FIGS. 7A and 7B are diagrams showing a stitching image in a translation using cross power spectrum (CPS)
Figure 7B:
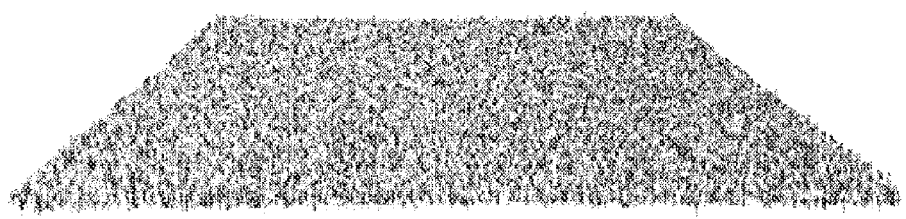

In fact, an image is bit noise such as cross-power spectrum of two images, as shown in FIGS. 7A and 7B.

It is therefore desirable to seek a peak of the CPS and derive a translation parameter $(x_t, y_t)$ from the peak.

FIGS. 7A and 7B are diagrams showing stitching images in the translation using the cross-power spectrum (CPS).

FIG. 7A shows the result of the stitching of two images. A two-dimensional translation can be obtained by detecting the peak of the CPS, as shown in FIG. 7B. Here, if the CPS is readable, the images are completely matched.

Since it is difficult to detect a maximum peak in an image with much noise, some peaks may be selected.

Next, the principle of extraction of a parameter by using block matching (BM) process will be described with reference to FIGS. 8 to 14.

The BM includes the function of deriving the peak of the above-mentioned cross-power spectrum (CPS).

Figure 8:
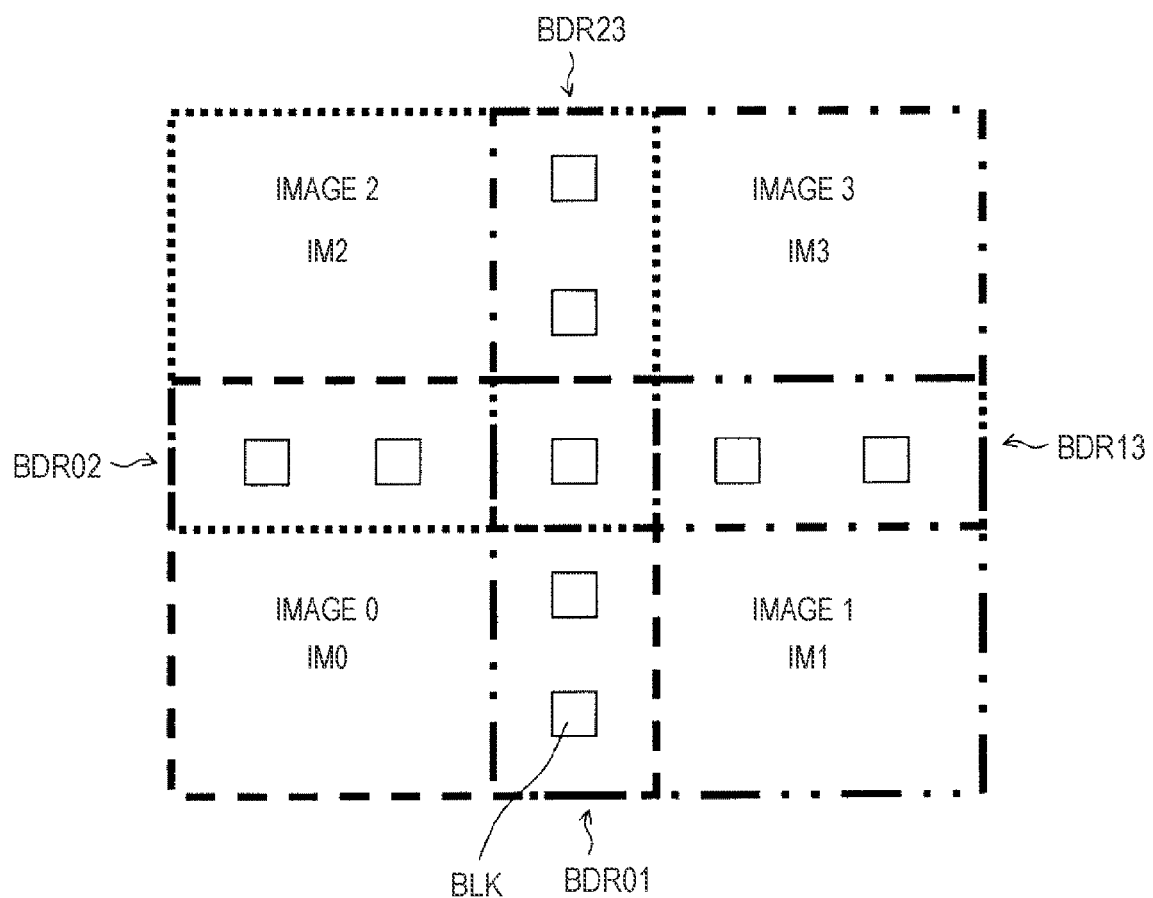
FIG. 8 is a diagram for explaining the process of extracting a parameter by block matching (BM), specifically showing the process of selecting four images of good condition.

Referring now to FIG. 8, four images IM0, IM1, IM2 and IM3 of good condition are selected.

Assuming, for example, that the image arranged at the lower left corner is the zero-th image IM0, its right-hand one is the first image IM1, the upper left one is the second image IM2, and its right-hand one is the third image IM3. These images IM0 to IM3 are arranged to include an overlapping portion in the boundary between the adjacent images.

In FIG. 8, rectangles arranged in the boundary regions are blocks BLK.

Thus, the BM is performed under the above-mentioned condition of arrangement.

Then information of lens distortion, angles of view, and tilting angles are obtained from four boundaries BDR01, BDR02, BDR13 and BDR23 in the lower, left, right and upper regions, respectively.

The BM (block matching) will further be described.

Figure 9:
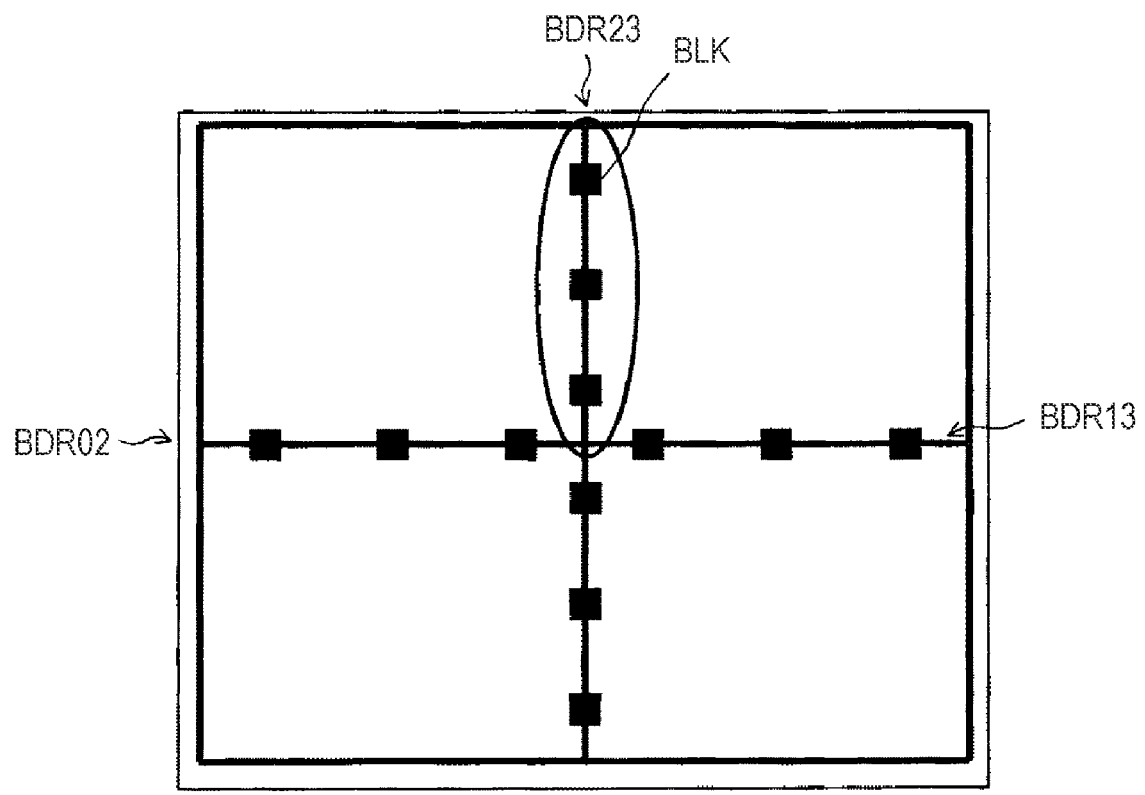
FIG. 9 is a diagram for explaining the process of extracting a parameter by BM, specifically showing an example of performing BM at three positions in a boundary.

The BM is performed with respect to three positions in a boundary, as shown in FIG. 9.

Figure 10:
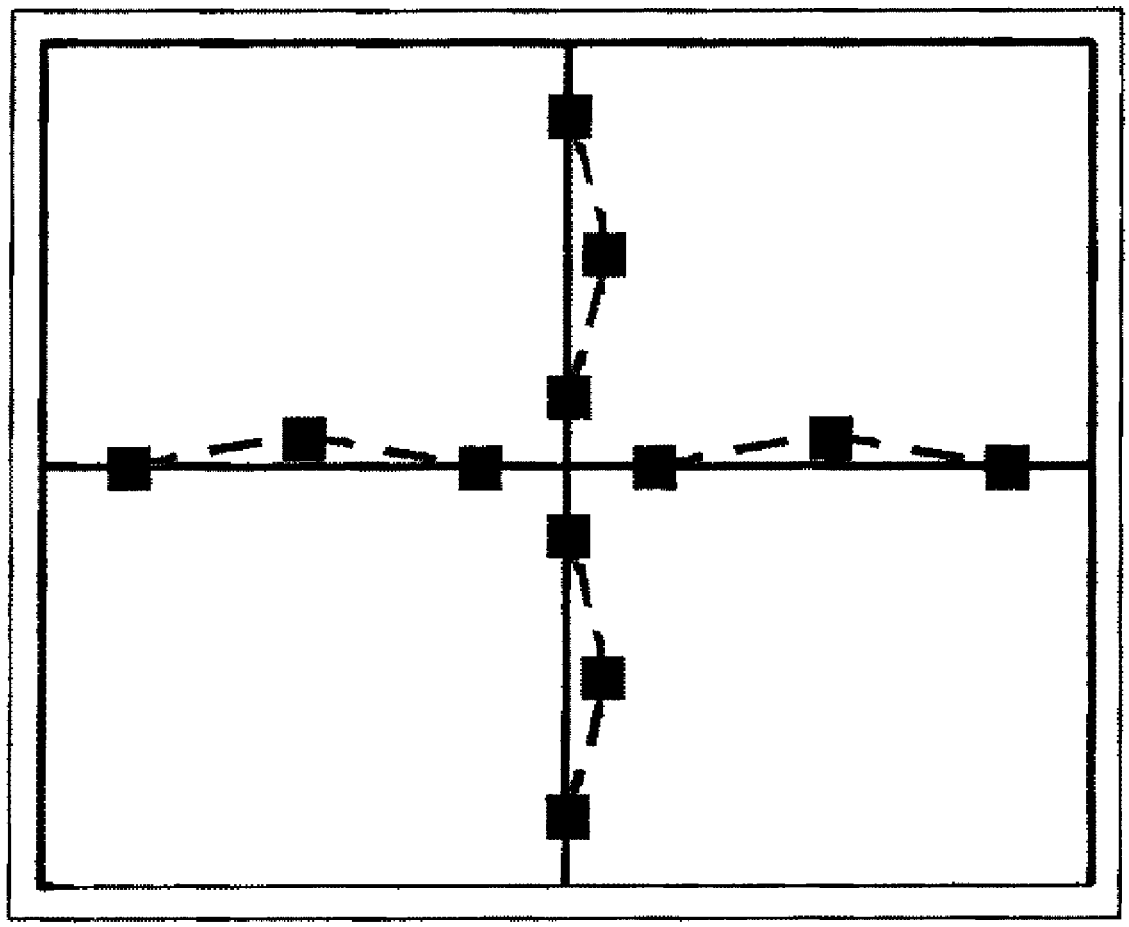
FIG. 10 is a diagram for explaining the process of extracting a parameter by BM, specifically showing that the presence of lens distortion leads to arched results of the BM.

The presence of lens distortion leads to arched results of the BM, as shown in FIG. 10.

Figure 11:
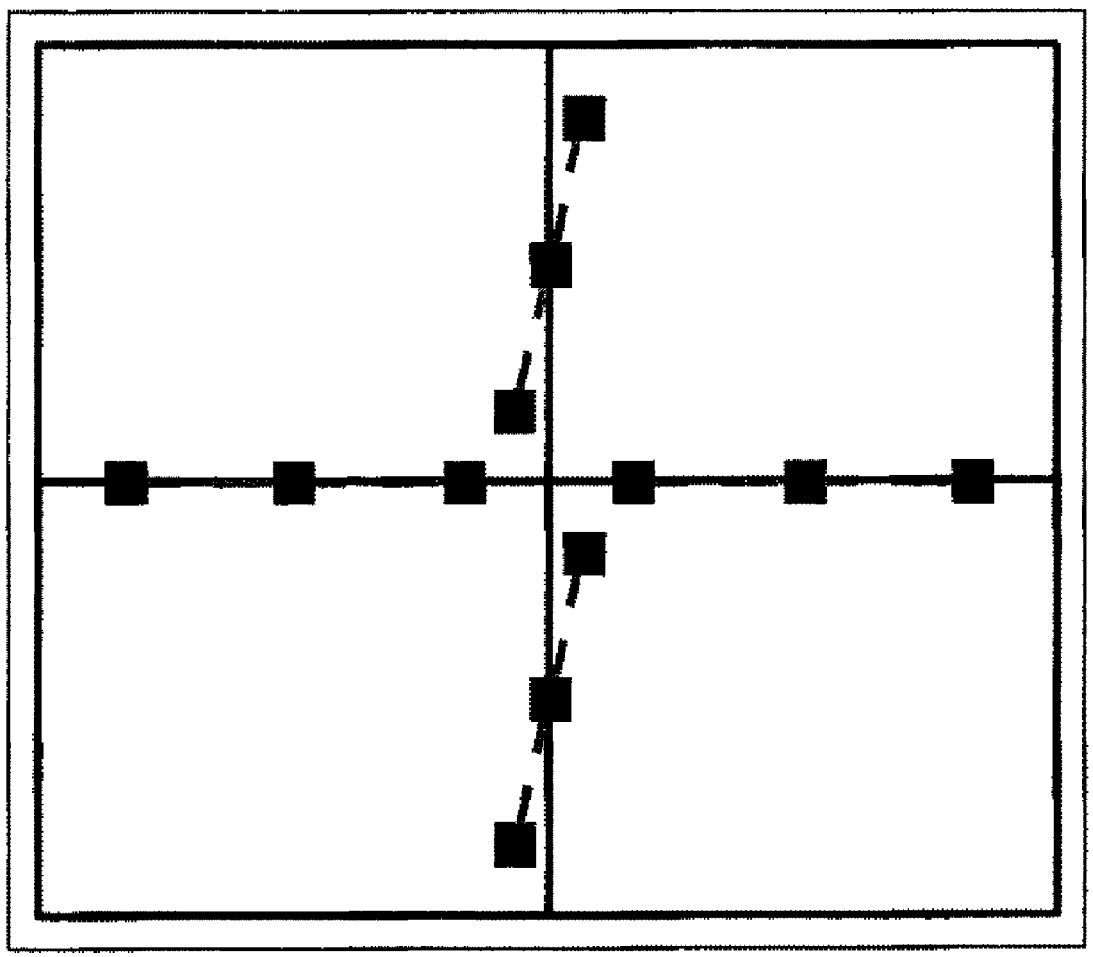
FIG. 11 is a diagram for explaining the process of extracting a parameter by BM, specifically showing a case where an improper tilting angle causes a right-to-left error.

Any improper tilting angle causes a lateral tilting error in the result of the BM, as shown in FIG. 11.

Figure 12:
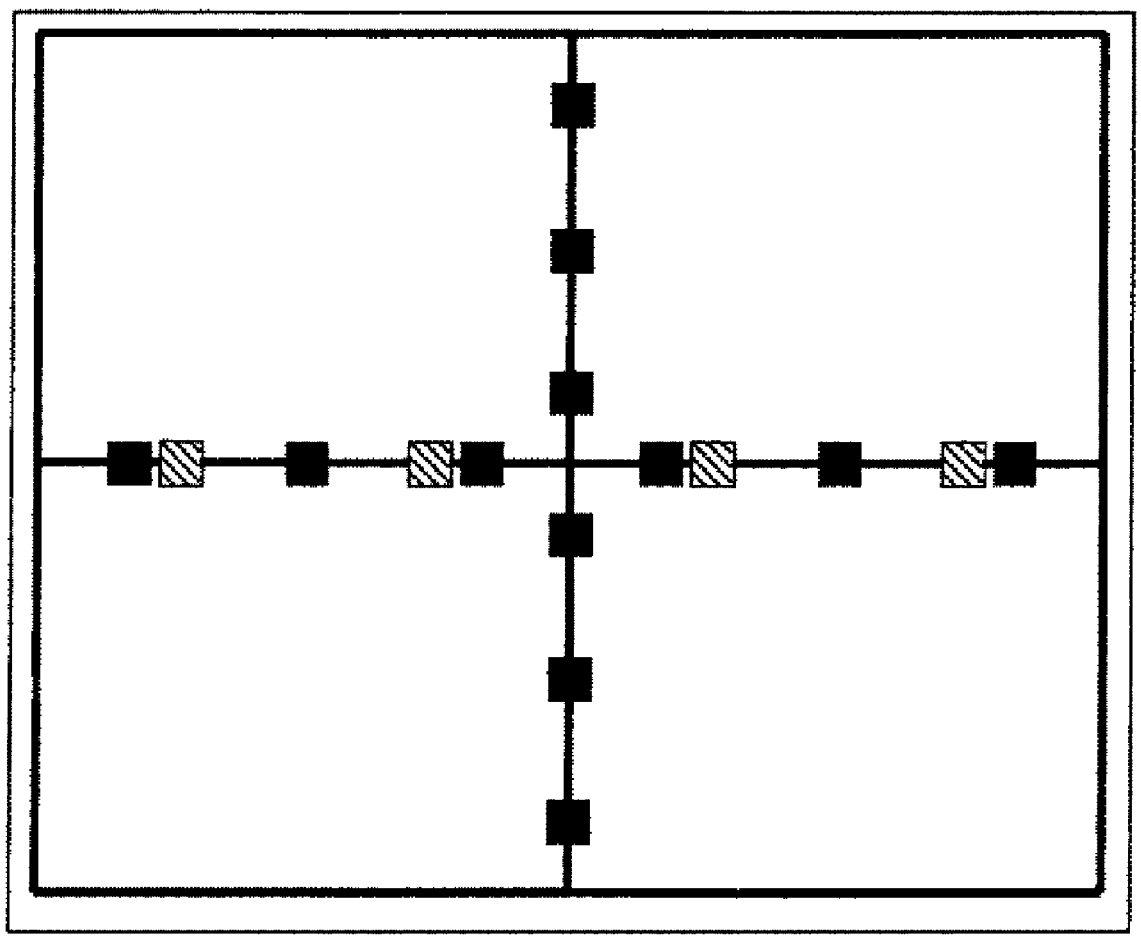
FIG. 12 is a diagram for explaining the process of extracting a parameter by BM, specifically showing a case where a lateral deviation is generated by the presence of vertical expansion and contraction in the right and left boundaries.

When the center of lens distortion is deviated vertically, lateral expansion and contraction occur in the upper and lower boundaries, as shown in FIG. 12. The vertical expansion and contraction in the right and left boundaries result from a lateral deviation of the center of lens distortion.

Figure 13:
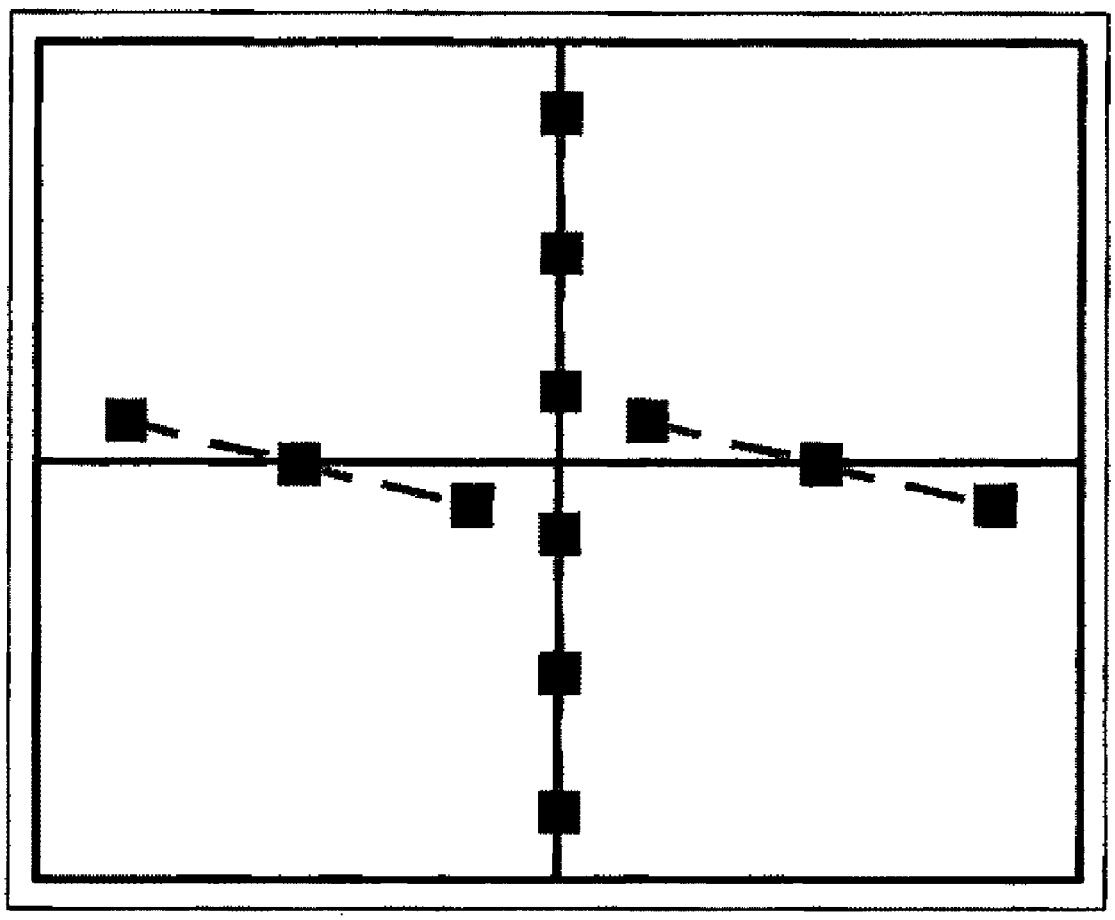
FIG. 13 is a diagram for explaining the process of extracting a parameter by block matching (BM) process, specifically showing an example of an error generated in the rotation of an image.

When the image is rotated as it goes upward, a vertical tilting error occurs as shown in FIG. 13. That is, FIG. 13 shows the result when the camera is not oriented to the front with respect to a mechanical tilting axis.

Various parameters are determined to minimize these errors.

This enables the errors to be reduced even if any four pieces are connected together.

For example, fast phase correlation matching is applied to perform the corresponding BM in the image. The respective parameters can be quantified by obtaining a vector shift $(x_{ij}, y_{ij})$, and then analyzing the behavior of shifts of the three blocks.

Figure 14A:
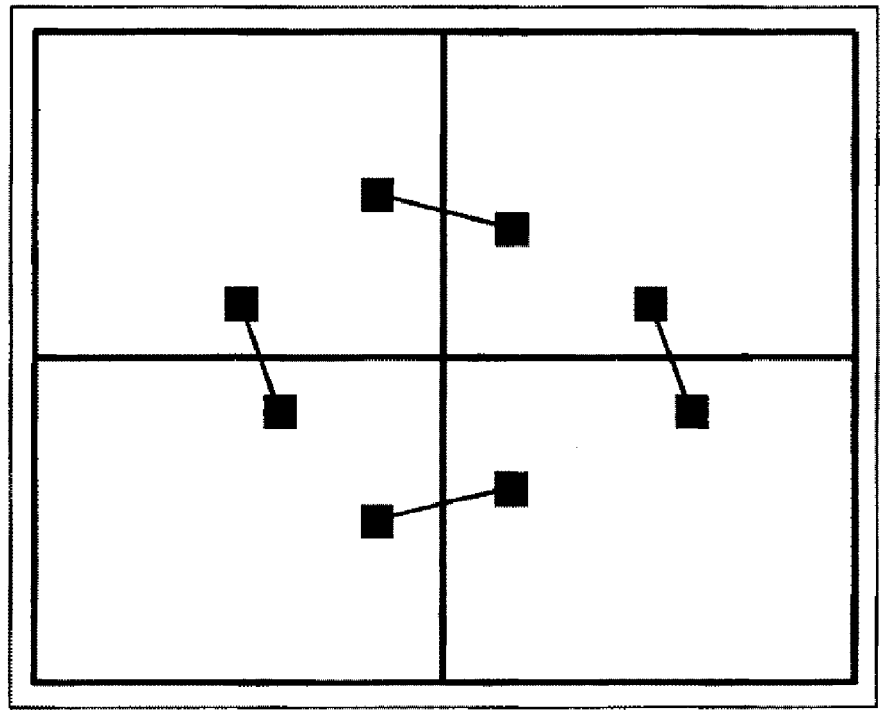
FIGS. 14A and 14B are diagrams for explaining the process where after the process of extracting a parameter by BM is performed, errors can be minimized by expanding the BM to a large number of pieces and performing a translation.
Figure 14B:
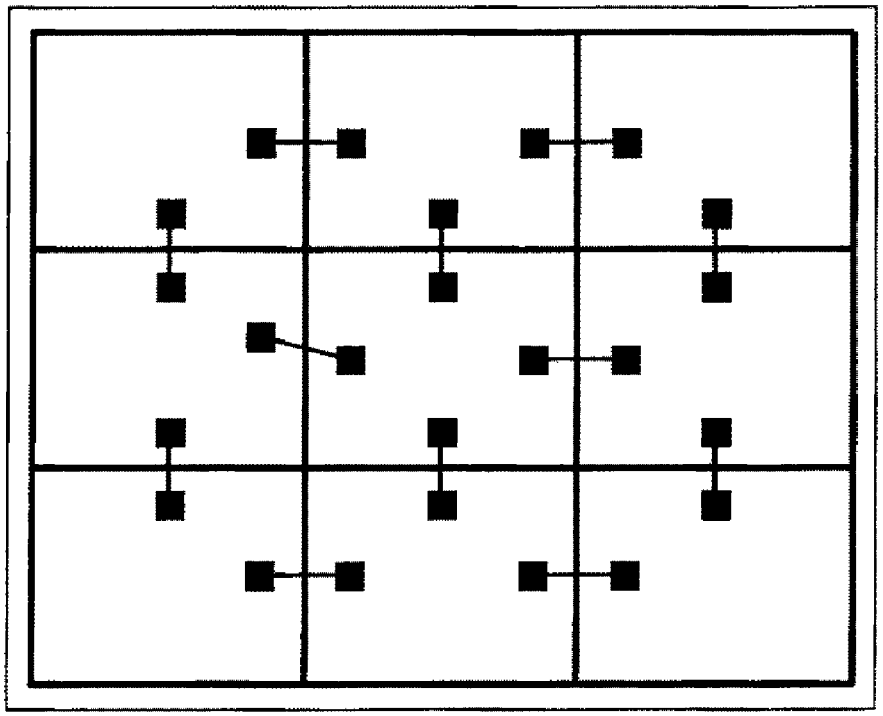

After performing the BM of the above-mentioned four pieces, as shown in FIGS. 14A and 14B, the BM is expanded to a large number of pieces, and simultaneously the results of the BM are evaluated with respect to all the boundaries. The precise combining of the plurality of images is executed by updating the optical axis direction so as to reduce the errors in all the boundaries.

In this case, a piece of reference image is determined, and other images are parallel-translated so as to converge at such positions as to minimize the errors.

The precise combining processing is basically performed according to the following processing, which is itemized as below.

An optimum position is found for shift by translations.

In this case, the loop is rotated.

A parameter fxy indicating the total of shift amounts is set to 0.0.

All the upper, lower, right and left (vertical and lateral) images are processed.

The reference image remains unmoved.

The positional relationship with the adjacent images is found from the results of the BM. Based on this, a shift amount is calculated.

The method thereof is as follows. The image directly above and its right neighbor are added, and the image directly below and its left neighbor are subtracted to obtain an average, which is expressed as f[y] [x].x, f[y] [x].y.

An 80% thereof is added to the central position of the present image and is regarded as the central position of a new image.

The total of the absolute values of the shift amounts of all the images is entered into the fxy.

Calculation is made to confirm how the above-mentioned shift improves the vertical and lateral positional relationships.

The fxy has the property (nature) that it becomes small by repeating the above-mentioned shift.

In other words, the fxy is converged to the state where no more shift can be performed.

The processing is terminated when the fxy is sufficiently small.

A description will be made of an exemplary embodiment of the specific processing of image combining free from wrinkles even when connecting several thousands of pieces.

It is considered now the case of four pieces of images.

As shown in FIG. 8, it is assumed that the image on the lower left corner is the zero-th image IM0, its right neighbor is the first image IM1, the upper left one is the second image IM2, and its right neighbor is the third image IM3.

The zero-th image IM0 remains unmoved. That is, the zero-th image IM0 is used as a reference image.

The lateral components of the results of the BM are expressed as bx1[0], bx1[1], bx2[0], and bx2[1].

The vertical components are also processed independently; however, for purposes of description, only the processing of the lateral components will be described below.

The bx1 expresses right and left, and the bx2 expresses above and below. The figure 0 in "[ ]" means below or left.

When the right or upper image with respect to the reference image IM0 is positioned right or above, the BM result is a positive value.

As an extreme example, assuming that there is only one abnormal value, and that bx1[0]=10, bx1[1]=0, bx2[0]=0, and bx2[1]=0.

Considering that there is a lateral 10-pixel deviation in the first row, and the other three boundaries have no deviation.

If the position of the first image IM1 is determined by the BM results of the zero-th image IM0 and the first image IM1, the position of the third image IM3 is determined by the BM results of the first image IM1 and the third image IM3. Moreover, the position of the second image IM2 is determined by the BM results of the second image IM2 and the third image IM3, a large value of 10 pixels may occur as wrinkles in the positional relationship between the zero-th image IM0 and the second image IM2.

The system of the present embodiment indicates that the influence of an abnormal value "10" is dispersed by 2.5. This processing is executed in accordance with a program, part of which will be described later.

An amount to be parallel-translated is found from the positional relationship with an adjacent image by xypos2( ).

For the first time, it is calculated that the first image IM1 should be shifted −5 pixels.

The first image is parallel-translated by move ( ).

The actual shift amount is 80% thereof, namely 4 pixels.

The shift amounts of the images IM1, IM2 and IM3 other than the zero-th image IM0 are pox[1]=4, pox[2]=0, and pox[3]=0, respectively.

From this, the BM result bx1[0] is changed from 10 to 6.

Consequently, bx2[1] is changed from 0 to 4.

For the second time, it is calculated that the first image IM1 should be shifted −1 pixel.

It is calculated that the third image IM3 should be shifted −2 pixels.

When a 80% thereof, namely 0.8 is added, pox[1]=4.8.

Subsequently, a similar calculation is continued from the third time to the 32nd time. For the 32nd time, the total of the shift amounts fxy is below 0.001 pixels, and the processing is terminated.

At this time, the number of pixels to be parallel-translated is 7.5, 2.5, and 5.0. The positional relationships of the respective images are changed as follows. That is, bx1[0]=10 is changed to bx1[0]=2.5, bx1[1]=0 is changed to bx1[1]=−2.5, bx2 [0]=0 is changed to bx2 [0]=−2.5, and bx2 [1]=0 is changed to bx2 [1]=2.5. It can be seen that the errors are dispersed.

List below are the number of times and the values thereof when ii=32, fxy=0.00083, namely fxy is not more than 0.001.

| n | ix | fx [n] | fy [n] |
|---|----|--------|--------|
| 0 | 0  | 0.000000 | 0.000000 |
| 1 | 2  | −0.000244 | 0.000000 |
| 2 | 2  | −0.000244 | 0.000000 |
| 3 | 2  | −0.000344 | 0.000000 |

| n | pox [n] | poy [n] | fz [n] | Number of pixels to be parallel-translated |
|---|---------|---------|--------|--------|
| 0 | 0.00 | 0.00 | | |
| 1 | 7.50 | 0.00 | | |
| 2 | 2.50 | 0.00 | | |
| 3 | 5.00 | 0.00 | | |

The following are part of an example of the program.

```
---- the part of the program (from here) ----------------
  clrpos( );          // Enter 0 in an amount to be parallel-
translated [pixel] pox[ ], fzx[ ], and rolla[ ].
  for (ii=0;ii<1000;ii++){
    xypos2( );   // Find an amount to be parallel-translated
from the positional relationship with an adjacent image.
    if (fxy<0.001){break;}
    move( );    // Parallel-translation.
  }
fprintf(inf,"ii=1230484, fxy=0.00000 the number of times and the value
thereof when fxy is not more than 0.001\n",
ii,fxy);
  xypos( );     // Find a parallel-translation amount from the
positional relationship with an adjacent image.
  move( );     // Parallel-translation.
  dsppos( );   // Display a correction amount.
  angle( );    // Convert the correction amount to an angle, and
```

-continued

```
update qq[n], pp[n].
    dsppos( );      // Display the correction amount.
    dsperr( );      // Display those having a value exceeding 1 in the
error between a pair of small images.
    step( ); //Create a step angle from qq[n], pp[n]
-- the part of the program (till here)-----------------
```

The following are a main subroutine.

```
--Main subroutine---------------------------
void xypos2( ){            // Find parallel-translation amounts
fx[n], fy[n] from the positional relationship with the adjacent image,
// Find a flag fz[n] that cannot be parallel-translated.
(Delete fprintf)
    int m, n, m2, n2, h, v, ix;
    double cx, cy;
    //fprintf(inf, "n ix fx[n] fy[n] \n");
    fxy=0;
    for (v=0;v<ny;v++){         // about all images
        for (h=0;h<nx;h++){
            m=(nx-1) *v+h;      // right and left boundaries
            n=nx*v+h;           // upper and lower boundaries
            ix=0;
            if ((0<skip[h][v])||((v==(ny-1)/2)&&(h==(nx-1)/2))){//
The central image and determined flag image remain unmoved.
                fx[n]=0;fy[n]=0;fz[n]=4;   // fz[n] is a flag that cannot
be parallel-translated
            if (skip[h][v]==2){fz[n]=2;} // Determined flag image is 2.
            }else{
                cx=0;cy=0;
                if (v!=0){              // when not the lowermost row
                    n2=n-nx;            // directly below
                    if (0<fok2[n2]){
                        ix++;
                        cx-=bx2[n2];    // subtract that directly below
                        cy-=by2[n2];
                    }
                }
                if (v!=ny-1){           // when not the top row
                    if (0<fok2[n]){
                        ix++;
                        cx+=bx2[n];     //add its own
                        cy+=by2[n];
                    }
                }
                if (h!=0){              // when not the leftmost end
                    m2=m-1;             // left neighbor
                    if (0<fok1[m2]){
                        ix++;
                        cx-=bx1[m2];    // Subtract left neighbor
                        cy-=by1[m2];
                    }
                }
                if (h!=nx-1){           // when not the rightmost end
                    if (0<fok1[m]){
                        ix++;
                        cx+=bx1[m];     // add its own
                        cy+=by1[m];
                    }
                }
                if (ix==0){
                    fx[n]=0;fy[n]=0;fz[n]=1;
                }else{
                    fx[n]=cx/ix;
                    fy[n]=cy/ix;
                    fz[n]=0;
                }
                fxy+=fabs(fx[n])+fabs(fy[n]);
            }
        }
    }
}
//*************************************
void move( ){      // Parallel-translation.
    int m,n,h,v;
    for (v=0;v<ny;v++){       // central position of image (pixel)
        for (h=0;h<nx;h++){
            n=nx*v+h;
            if (fz[n]==0){    // when not isolated from
surroundings
                pox[n]+=-fx[n] * 0.8;
                poy[n]+=-fy[n] * 0.8;
            }
        }
    }
    for (v=0;v<ny;v++){           // Lateral positional relationship
        for (h=0;h<nx-1;h++){
            m=nx*v+h;
            n=(nx-1)*v+h;
            bx1[n]+=-(fx[m]-fx[m+1]) * 0.8;
            by1[n]+=-(fy[m]-fy[m+1]) * 0.8;
        }
    }
    for (v=0;v<ny-1;v++){         // Vertical positional relationship
        for (h=0;h<nx;h++){
            n=nx*v+h;
            bx2[n]+=-(fx[n]-fx[n+nx])*0.8;
            by2[n]+=-(fy[n]-fy[n+nx])*0.8;
        }
    }
}
//*************************************
```

As described above, according to the first configuration of the present embodiment, even when a digital camera mounting thereon the CMOS image sensor is used, it is possible to image images at a high frame rate without reducing the resolution, thereby reducing the influence of the parallax, the ambient light reduction, and the lens distortion. Moreover, it is possible to create a high-quality panoramic image.

This enables the precise combining and also suppresses the occurrence of color non-uniformity, irrespective of the number of images to be combined.

The lens distortion correction coefficient can be extracted from actually imaged images. This eliminates the necessity of complicated calibration operation, remarkably improving precision.

With the method causing no wrinkles even when connecting several thousands of pieces, the necessary range can be taken at the necessary resolution, without paying attention to the number of shots.

Next, the second configuration will be described.

[Second Configuration]

Recording of spatial positions of continuously imaged images will be described.

<Overview>

A panoramic photography based on continuous imaged images is an operation of dividing a space to combine the images into a piece of image. When a panoramic image is created from the images, a high-precision panoramic image can be obtained by performing reverse computation using the spatial information at the time of imaging.

In the present embodiment, the information on an imaging space in which imaging is performed is calculated from sensors and images at the time of imaging the images, and the information is assigned to each piece of the images, so that the information can be used for generation of the panoramic image.

<Assigning Information on Imaging Space>

For example, when performing a panoramic photography, a lens is driven by a motor with a viewpoint fixed at one point and the shooting direction is changed.

In the images imaged under this condition, the position of the camera apparatus 10, namely the focal position is fixed and only the shooting directions are different. Therefore, in this example, the description will be limited to a case where the images are images that are obtained by imaging the surroundings of an object with a fixed angle of view from a certain point.

In such an imaging method, there will be two kinds of information on the imaging space, as follows.

That is, one of them is information (viewpoint vector) on the point the imaging is targeting, and the other is information on a rotation angle (rolling angle) around the viewpoint vector.

<Definition of Projection Sphere and Space>

An image of a space is projected onto a piece of plane.

In order to handle all orientations when a panoramic image of a space is imaged, it will be helpful to assume that there is a sphere around a photographer and the panoramic image is projected onto the sphere from the perspective of easy image processing. When the viewpoint vector is defined by using the sphere, the coordinate space is also determined.

The projection sphere having a radius of 1 is defined with the origin (0, 0, 0) used as the focal position at which the camera apparatus 10 is located.

Assuming the front direction in the horizontal state be defined as a coordinate f(0, 0, 1) which is located at a distance of 1 on the Z axis, the viewpoint vector can be expressed as a vector oriented from the origin (0, 0, 0) toward the point f(0, 0, 1).

The viewpoint vector becomes a unit vector having a length of 1, and the length will be 1 in any orientation.

Since the frame's rolling information cannot be recorded only with the viewpoint vector v1, another rolling vector v2 has to be recorded. This is information representing the upward direction of an image, and a subtraction of these vectors, v2−v1, becomes a vector representing the upward direction of the image.

This enables to express the shooting direction of images with two vectors (two points on the projection sphere) and to locate any point in all orientations without producing any density difference.

<Relative Shift and Absolute Coordinates>

The information on the imaging space includes two kinds of information, namely relative information and absolute information.

From the viewpoint of creating a panoramic image, although it is good to have absolute position information regarding the orientation in which the image is imaged, since it is difficult to obtain accurate absolute information, the position information is integrated from relative information or corrected using rough absolute information.

In a lens-driving panoramic camera, although the scenario of moving the lens is absolute information, since relative information such as shaking at the time of imaging, incorporation of errors at the time of driving the lens, variation in the precision of a position sensor is added thereto, the precise absolute value is obtained through calculation.

<Space Expansion of Relative Shift>

Now, it will be assumed that accurate relative information is obtained with the aid of image recognition and a position sensor.

When the present image frame f1 is shifted by (dx, dy) in position from the previous image frame f2 and the frame is rolled by an amount of rz, the amounts of rotation around the x and y axes can be calculated as rx and ry from the angle of view. At this time, the viewpoint vector v1 of the frame f1 becomes the result of rotating the viewpoint vector v2 of the frame f2 by an amount of (rx, ry, rz).

Although the absolute position on the projection sphere can be calculated based on the information, the calculation of calculating the absolute position by rotating by the amount of (rx, ry, rz) from the position of the vector v2 is a little complex.

Therefore, the latest image f1 is fixed at the front plane vector v1 (0, 0, 1), and images arranged on the projection sphere, including and later than the previous image f2 are rotated by the amount of (−rx, −ry, −rz) for each sphere. That is, other images are shifted relative with the latest image f1.

By repeating this operation, the position of the last image will be on the coordinates (0, 0, 1), and the absolute coordinates of all the remaining images will be obtained.

The reason why the rolling information is expressed by two vectors of the viewpoint vector and the rolling vector is because it is easy to perform the relative rotation (rotating the sphere itself).

<Deviation Between Relative Shift Integration Value and Absolute Information>

Although only the relative information was used for spatial arrangement of the images, it is in fact possible to obtain absolute information such as rolling information or vertical inclination from the position sensor 14 or the like. However, the absolute information obtainable from the position sensor 14 is rough compared to the precision necessary for generating the panoramic image and it is thus difficult to use the values as they are.

On the other hand, although the relative information has high precision because it is obtained through image recognition, errors are incorporated therein. When the relative information is integrated, a small error may appear and cause a large error due to the integration errors.

Therefore, the absolute information obtained form the position sensor 14 is used for confirming whether or not the integration errors have occurred.

The relative information is compared with the absolute values of the position sensor at certain intervals during the space expansion processing of the relative shift. If the relative shift is too far from the absolute values of the position sensor, the relative shift is corrected using the absolute values of the position sensor. Moreover, the shift amounts are relatively integrated from that position.

Figure 15:
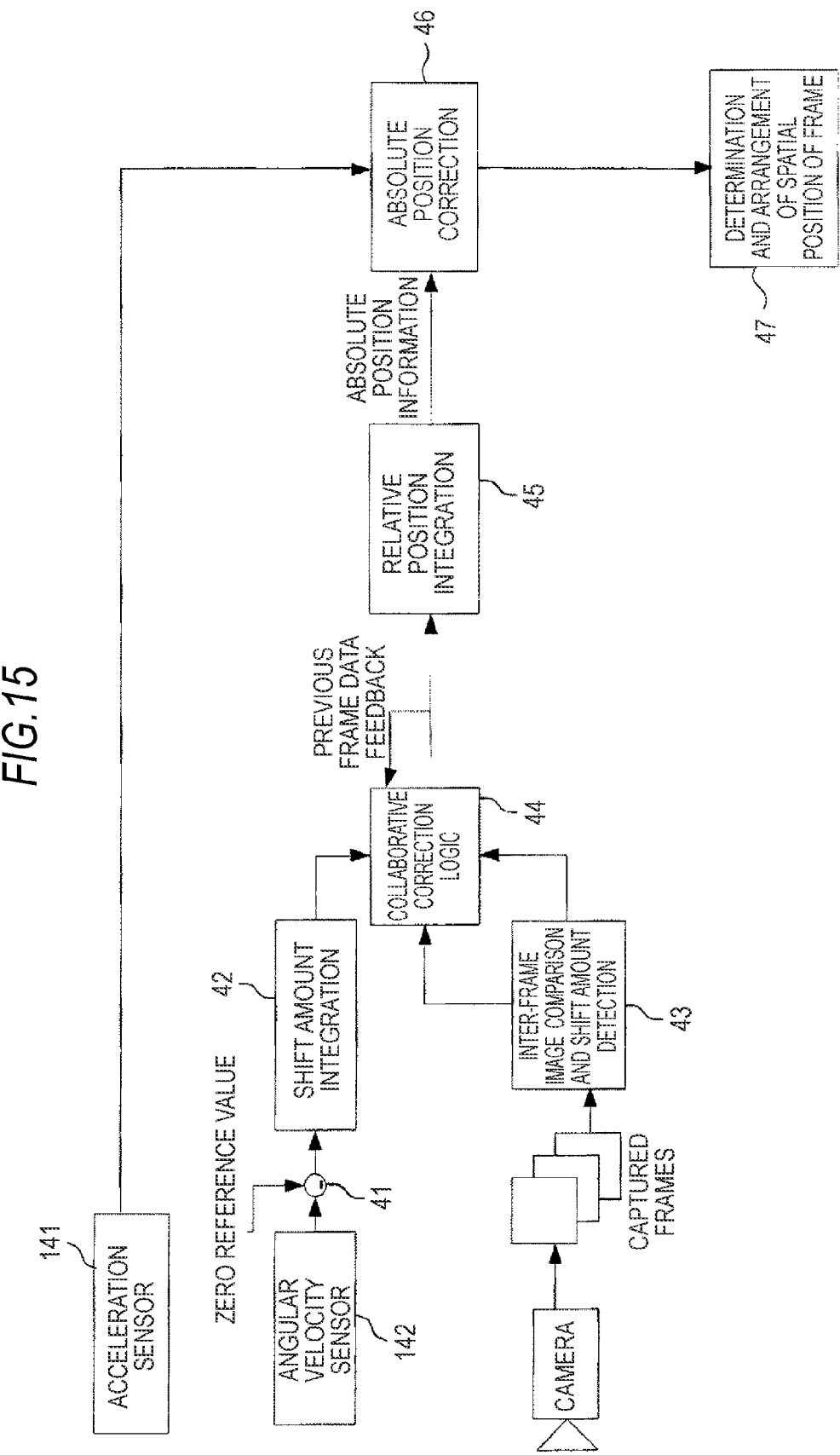
FIG. 15 is a functional block diagram showing the method for spatial arrangement based on continuously imaged images and sensor information.

FIG. 15 is a functional block diagram showing the method for spatial arrangement based on continuously imaged images and sensor information.

In FIG. 15, a functional block 41 sets a zero reference value with respect to the detection signal of the angular velocity sensor 142, and a shift amount integration section 42 integrates the shift amounts.

Moreover, a detection section 43 compares inter-frame images imaged through the imaging device 12 with each other and detects the shift amounts.

A collaborative correction logic 44 performs collaborative correction based on the outputs of the shift amount integration section 42 and the detection section 43, and a relative position integration section 45 integrates the relative positions to obtain absolute position information.

Moreover, based on the detection results of the acceleration sensor 141, an absolute position correction section 46 corrects the absolute position information, and an arrangement section 47 determines spatial positions of frames and arranges the frames.

<Spatial Coordinate Information and Panoramic Image>

The above-mentioned calculation is performed in the course of imaging, and spatial coordinate information, namely the shooting direction is recorded simultaneously as metadata.

Although the panoramic image can be generated with only the metadata, the spatial coordinate information may be used as basic data when performing precise adjustment and authoring in the post processing.

Since there has not been the metadata representing the shooting direction in a space, it was not possible to obtain more precise panoramic images. However, in the present embodiment, coordinate information is assigned at the time of imaging in order to solve this problem.

As described above, in the second configuration, continuously imaged images are spatially arranged using the frame shift information obtained via a technique of image recognition and the shift information obtained from the position sensor. Portions of which the information is not obtainable through this image recognition are replaced with position sensor information, and the position sensor information is used as auxiliary coordinates for confirmation of the success in the image recognition or to be used when the image recognition has failed. The images that are spatially arranged are combined into one panoramic image.

This method enables to express correctly not only the image at the vicinity of the front but also the images directly above and directly below and to comply with imaging in all orientations or of the celestial sphere.

It is possible to render a wider scene at the vicinity of the front without errors.

Needless to say, it is possible to comply with hand-held imaging and to obtain high-precision images.

Next, the third configuration will be described.

[Third Configuration]

Correction of position recognition based on continuously imaged images will be described.

<Overview>

In order to give shooting position information to continuously imaged images, the present configuration uses a so-called dynamic calibration, which is a method incorporating the position sensor and the image recognition.

<Continuous Imaging and Shooting Position Information>

When a panoramic image is combined using continuously imaged images, there is a case where high-frequency components are not contained in the image and it is unable to specify the continuity from the image.

In such a scene, it is unable to obtain information regarding how much the consecutive frames are shifted, making it unable to generate the whole panoramic image.

To enable obtaining the position information from such a scene, the shift information and the position information are recorded together with the images at the time of imaging with the aid of the position sensor 14.

<Use of Position Sensor>

The position sensor 14 uses the three-axis acceleration sensor 141 and the three-axis angular velocity sensor 142 in a simultaneous and parallel manner.

The angular velocity sensor 142 detects the rotational velocity of the camera, and the acceleration sensor 141 detects a horizontal acceleration.

Although the shift information is obtained from the imaged images as far as possible, in the case of a scene in which image recognition cannot be performed due to the condition of the image, the shift amount from the previous frame is obtained from the position sensor 14.

By comparing the overall amount of change in the detection results of the position sensor 14 with the shift amounts obtained via the image recognition, more precise position information can be obtained.

<Problem in Using Position Sensor>

However, depending on the intended panoramic photography, the precision of an image is higher than the precision of the position sensor 14. Therefore, when only the information of the position sensor 14 is used as the position information, the information becomes too imprecise for it to be used in creating a panoramic image.

Therefore, the position sensor information is used as auxiliary information when it is really difficult to obtain the position information but high precision is not expected.

Like general physical sensors, the output of the position sensor is also fluctuating without maintaining a stable output.

Moreover, the zero position at the static state changes depending on the situation, it is necessary to measure the value at the zero position by establishing a static condition before imaging. After measuring the value, the shift amount is measured by a deviation from the zero-point value.

<Image Recognition and Correction Thereof>

In the present configuration, the position sensor information is recorded as metadata while continuously imaging panoramic images.

In this method, since the output fluctuation of the position sensor 14 is too large, there is a problem in that the metadata information is difficult to use at the time of combining into a panoramic image.

Therefore, the metadata obtained by the image recognition is corrected and recorded at the time of imaging.

When the metadata is recorded, space information regarding the orientation of the camera is held therein and updated; however, the precision of the metadata values deteriorates due to various reasons.

Therefore, in the present embodiment, the space information held therein is corrected and updated in real-time based on the information from the image recognition and the position sensor; this process is dynamic calibration.

When consecutive panoramic images are imaged, two cases can be considered: one case is where there is already a moving scenario that the camera will be moved by the driving of a motor, and the other case is where there is not moving scenario because the camera is swept by the hands.

In the case where there is the moving scenario caused by the driving of a motor, although the rough shooting position can be detected in advance, it is difficult to consider a shaking or a shift during the imaging. The position sensor 14 is used for detecting such changes during imaging.

When the changes during the shooting are detected by the position sensor 14, a close examination is made as to the deviation of the detection results from the actual moving scenario by the image recognition. The image recognition can be made easy when the shift amount of the position sensor 14 is used as the basis of the close examination.

When it is possible to calculate a deviation from an expected moving scenario, the deviation is added to the values of the moving scenario and information on the actual shooting position is recorded as the metadata of the imaged image.

Since the moving scenario is not available when the camera is swept by the hand, the shift amount is calculated by the image recognition that compares the present frame with the previous frame whenever the frames are imaged.

In this case, since it is difficult to know the shift amount, a rough shift amount is obtained from the information of the position sensor 14, and the image recognition is performed based on the shift amount, whereby it is possible to calculate the shift amount with high precision.

If it is difficult to perform the image recognition, the shift amount obtained from the position sensor is recorded and is later collated with the positional relationship of the previous and subsequent frames, whereby the coordinates are determined.

Figure 16:
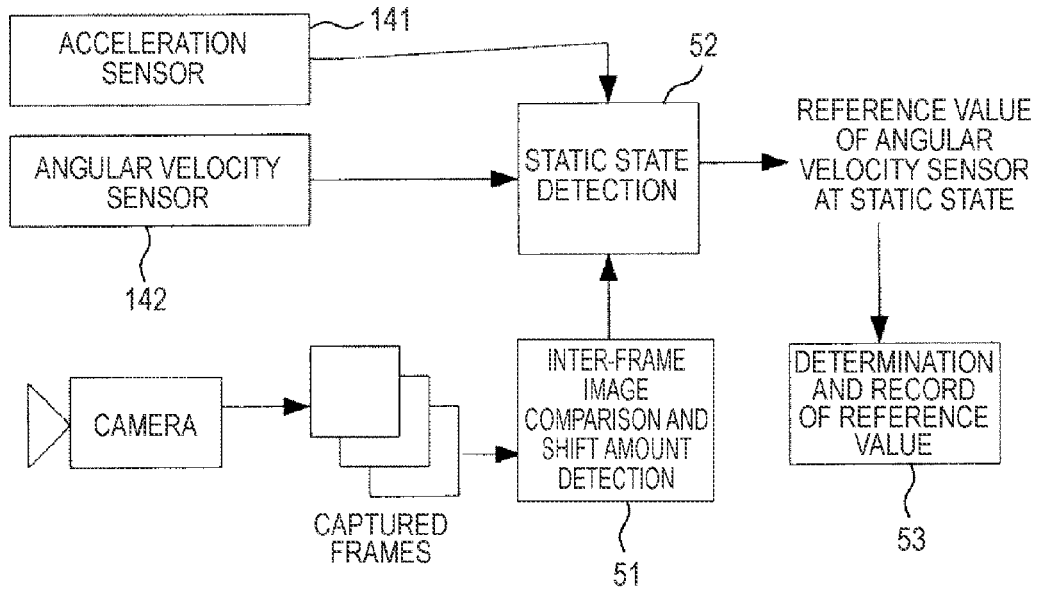
FIG. 16 is a functional block diagram showing the method for achieving high precision by correlating the continuously imaged images and the sensor information, specifically showing the zero correction of the static-state sensor values.

FIG. 16 is a functional block diagram showing the method for achieving high precision by correlating the continuously imaged images and the sensor information, specifically showing the zero correction of the static-state sensor values.

In FIG. 16, a detection section 51 compares inter-frame images imaged through the imaging device 12 with each other and detects the shift amounts.

A static-state detection section 52 performs static-state detection on the basis of the detection signal of the angular velocity sensor 142, the detection signal of the acceleration sensor 141, and the detection signal of the detection section 51, thereby obtaining a reference value of the angular velocity sensor at the static state.

Then, a recording section 53 determines the reference value and records the reference value in the memory 17.

Figure 17:
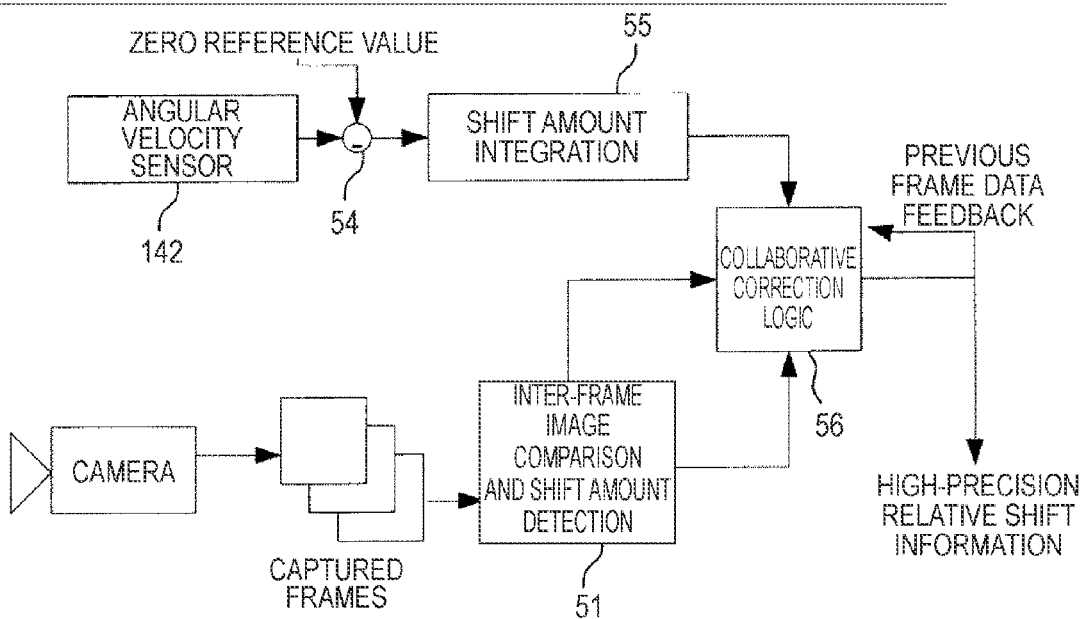
FIG. 17 is a functional block diagram showing a method for achieving high precision by correlating the continuously imaged images and the sensor information, specifically showing the method for achieving high precision via collaboration of shift information.

FIG. 17 is a functional block diagram showing a method for achieving high precision by correlating the continuously imaged images and the sensor information, specifically showing the method for achieving high precision via collaboration of shift information.

In FIG. 17, a functional block 54 sets a zero reference value with respect to the detection signal of the angular velocity sensor 142, and a shift amount integration section 55 integrates the shift amounts.

Moreover, a detection section 51 compares inter-frame images imaged through the imaging device 12 with each other and detects the shift amounts.

A collaborative correction logic 56 performs collaborative correction based on the outputs of the shift amount integration section 55 and the detection section 51 to obtain high-precision relative shift information.

As described above, in the third configuration, when recording continuously imaged images, frame shift information obtained via an image recognition technique is correlated with shift information obtained from a position sensor. Moreover, information, e.g., a pixel view angle of an image, a static-state value of a position sensor, and a corresponding pixel view angle of the position sensor value, which is indefinite on its own, is calculated.

Therefore, by a technique that collaborates a method of obtaining the shift information via the image recognition and a method of detecting the shift information from the position sensor, the method which cannot provide desirable precision on its own, it is possible to remarkably improve precision and stability.

The above-described second and third configurations will further be described in relation to FIGS. 18 to 21.

<Imaged Image and Rotational Movement of Photographer>

When the shooting position changes at the time of imaging a panoramic image, a discontinuity may occur due to parallax.

The discontinuity due to parallax cannot be corrected by image processing after the imaging.

Therefore, when a panoramic image is imaged, the photographer and the camera are fixed at a certain position, and the photographer takes images while rotating at that place so that the camera is focusing on one point.

In this case, the moving distance of a viewpoint as seen from two different imaged images is proportional to the amount of rotation during the shooting. If the image is a digital image and the size thereof can be expressed by a pixel count, the pixels shifted between the two pieces of images can be calculated back from the distance of the rotational movement during the shooting; in this case, an angle of view is used as a parameter necessary for the back calculation.

The angle of view is a numeric value representing the horizontal or vertical width of a scene imaged in an image in terms of a range of angles in a shooting space.

The angle of view is a parameter which is given by measurements before shooting and does not change during the shooting.

When a horizontal angle of view is 30 degrees and a horizontal pixel count of the imaged digital image is 1000, the shooting spatial angle per one pixel will be 0.03 degrees. That is, when it is recognized that the pixel shift amount between two pieces of images is 800 pixels, it can be calculated that the actual rotation (sweeping) angle of the camera is 24 degrees.

The angle of view per one pixel is used as the most important initial value.

Angle of view per one pixel=(Frame angle of view)/(Frame pixel count)

Rotation amount per two shots of images=(Pixel shift amount between two images)*(Angle of view per one pixel)

The actual angle of view per one pixel is held in advance as an initial value by measurements.

<Angular Velocity Sensor and Rotation Amount>

The angular velocity sensor outputs a present angular velocity.

Since the output value changes with time, the change in the angular velocity can be detected; however, that value does not directly represent the rotation amount. In order to obtain the rotation angle from the angular velocity sensor, it is necessary to define the unit of integration values.

Measurements are performed with the angular velocity sensor at predetermined intervals of time, and the measurement interval is fixed as an important parameter.

The measured angular velocities are integrated in terms of time, and in the meantime, the actual rotation amount needs to be obtained by measurements from the outside. The integrated angular velocity is divided by the actual rotation amount to calculate an angular velocity integration value per one degree.

Thereafter, the rotational shift amount can be proportionally calculated by dividing the angular velocity integration value by the angular velocity integration value per one degree.

The actual angular velocity integration value per one degree is held in advance as an initial value by measurements.

<Dynamic Calibration>

Although the output of the angular velocity sensor is a relative angular velocity, the output may change depending on the environment unless the angular velocity sensor is excellent. Since the change has an influence on the actual measurements, every measurement of the output needs to be corrected.

A process which is specialized to panoramic photography to automatically correct the output in accordance with the feedback information from the imaged panoramic image will be referred to as dynamic calibration.

The angular velocity sensor has two output values which change depending on the environment; one is a static-state zero point position and the other is the angular velocity integration value per one degree. Another item is the integration errors which accumulate with the relative shift; therefore, these three items are corrected.

<Angular Velocity Sensor and Zero Point Correction>

Figure 18:
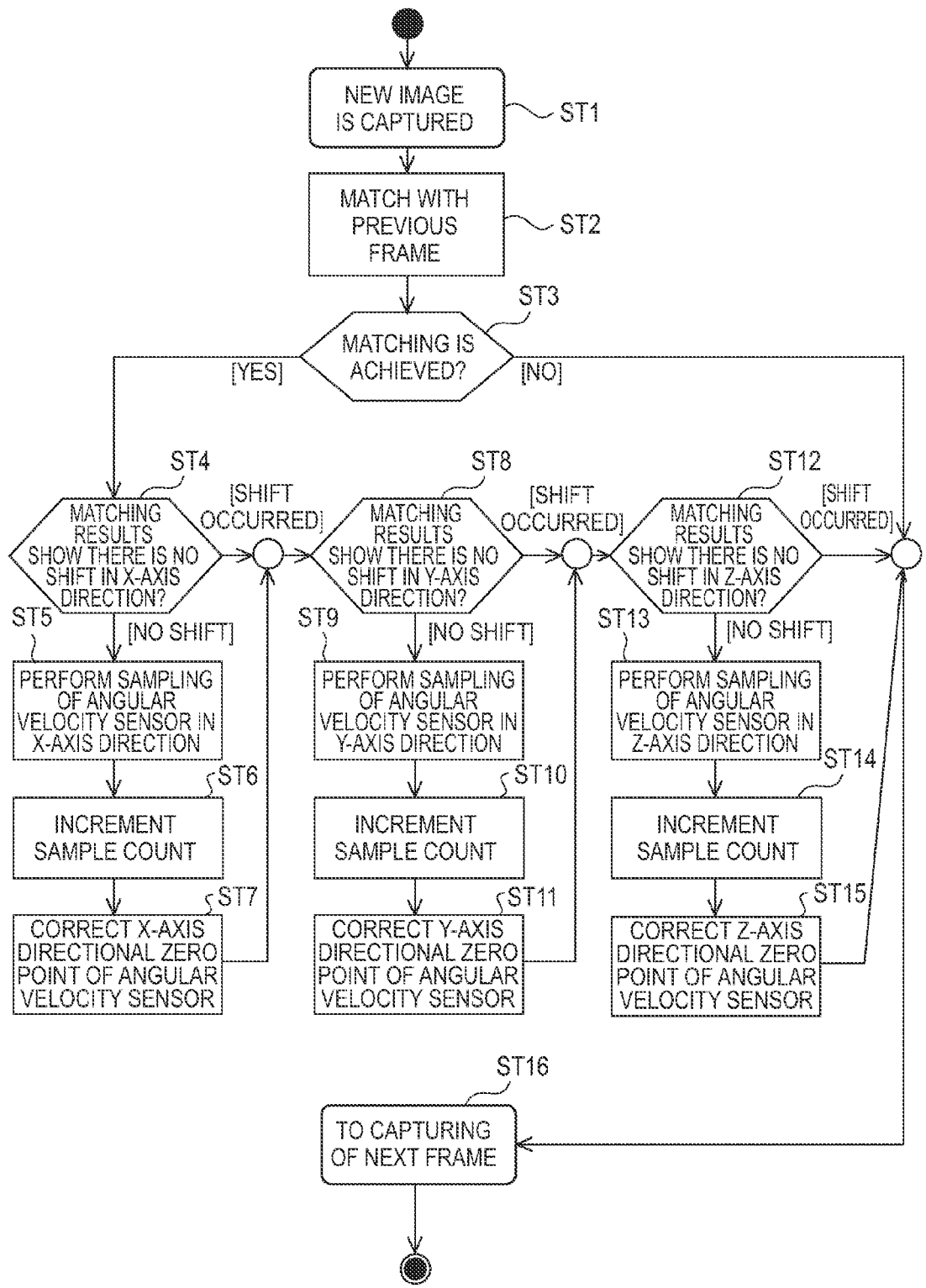
FIG. 18 is a flowchart of a zero point correction process of an angular velocity sensor.

FIG. 18 is a flowchart of a zero point correction process of the angular velocity sensor.

In the zero point correction process of the angular velocity sensor 142, operations of steps ST1 to ST16 in FIG. 18 are performed.

It is not possible to detect the angular velocity if the accurate output value in the static state of the angular velocity sensor 142 is not known. Moreover, the zero point in this static state will change depending on the environment such as temperature.

This zero point drift is corrected based on the results of image matching, thereby calculating the accurate zero point at the time of shooting. The initial value which is set in advance is used as the zero point output value of the angular velocity sensor 142 at the starting time.

Image matching between two frames is performed (ST1 to ST3). If the matching results are reliable one that includes high-frequency components and show that there is no shift in the X, Y, and Z-axis direction, the output values of the X, Y, and Z-axis components of the angular velocity sensor are sampled as the zero point values.

At this time, correction is performed using the values sampled as the zero point values (ST4 to ST15).

When a shift was detected in any axis direction, since it is not the zero point, neither sampling nor the zero point correction is performed.

When the sampling is performed, the zero point values are corrected while incrementing the sample count.

The correction is performed by calculating an average value of the results of calculation that divides the difference between the present zero point value and the sampled value by the sample count.

Corrected zero point value=(Zero point value)+
(Sampled value)·(Zero point value)·(Sample count)

<Shift Amount Correction of Angular Velocity Sensor>

Figure 19:
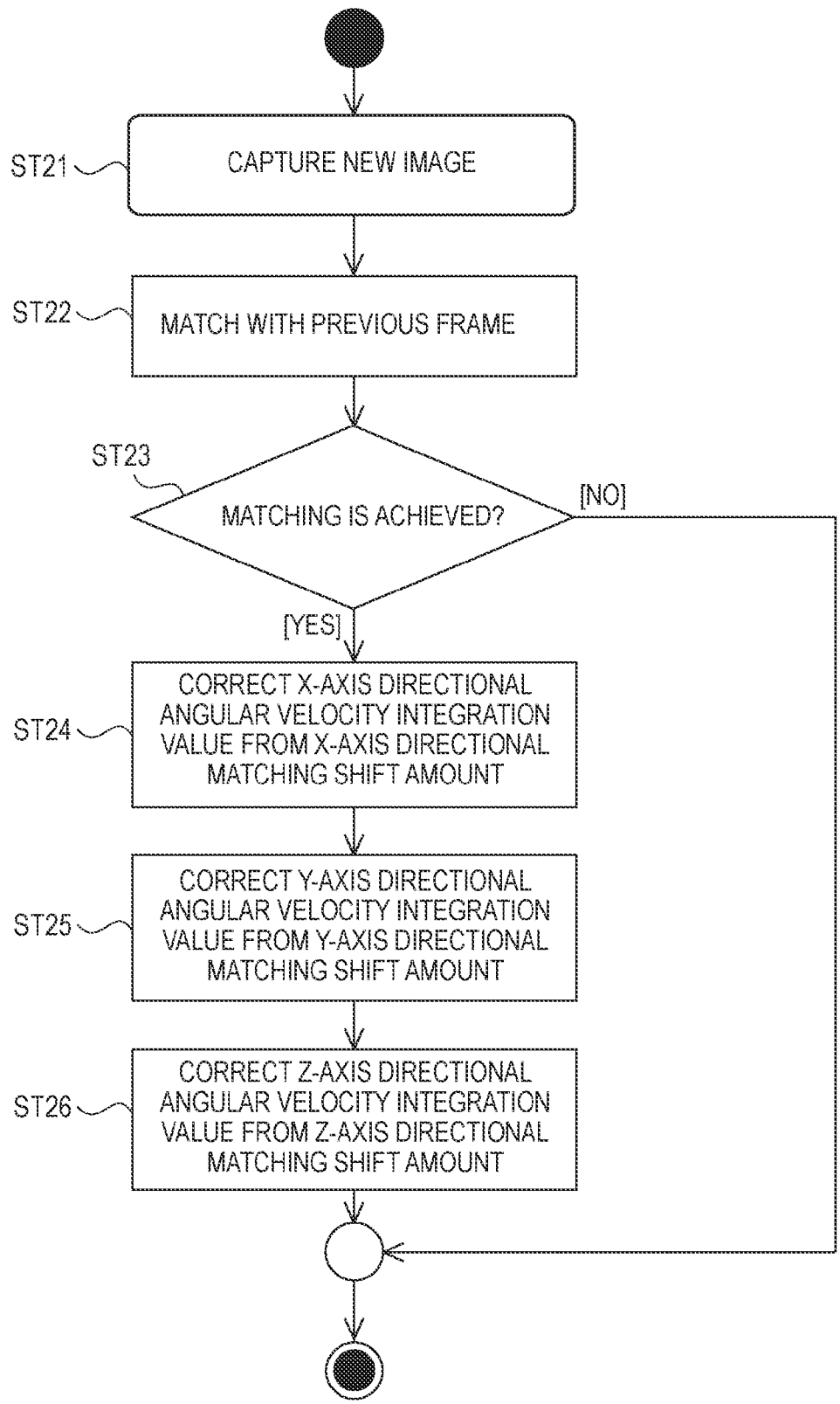
FIG. 19 is a flowchart of a shift amount correction process of an angular velocity sensor.

FIG. 19 is a flowchart of a shift amount correction process of the angular velocity sensor.

In the shift amount correction process of the angular velocity sensor, operations of steps ST21 to ST26 in FIG. 19 are performed.

The angular velocity integration value per one degree is a parameter for calculating the rotation angle from the angular velocity integration value of the angular velocity sensor, and this parameter will change depending on the environment such as temperature.

Image matching is performed (ST21 to ST23) to correct and update the angular velocity integration value per one degree based on the matching results, thereby calculating the accurate value during the shooting (ST24 to ST26).

If the results of the image matching between two frames are reliable one that includes high-frequency components, the angular velocity integration value per one degree is calculated from the shift amounts in the X, Y, and Z-axis direction, obtained through the image matching, and the angular velocity integration value at that time.

Angular velocity integration value per one degree=
(Angular velocity integration value)/(Angle of
view per one pixel)*(Pixel shift amount around
X axis)

Corrected angular velocity integration value per one
degree=(Angular velocity integration value per
one degree)+(Sampled value)·(Angular velocity
integration value per one degree)/(Sample count)

<Angular Velocity Sensor Assisted by Acceleration Sensor>

The angular velocity sensor outputs a relative angular shift amount.

The absolute position information regarding the present position is calculated by integrating the relative values obtained so far.

When the relative values contain a small deviation or noise, a large deviation may occur as the integration time increases.

Although the angular velocity sensor is capable of obtaining the absolute values of the Y-axis rotation (tilting) and the Z-axis rotation (rolling) by detecting the gravitational acceleration, the angular velocity sensor is only able to detect a lumped value thereof in the case of imaging panoramic images and is thus inferior to an acceleration sensor in terms of usability.

However, since the angular velocity sensor has a merit that it is capable of outputting the absolute values, the integration value and the absolute values can be corrected by periodically comparing them with the integration value of a relative shift distance.

When the camera is moved by such an absolute amount as it can be sufficiently detected by the acceleration sensor, the absolute amount is corrected if necessary by comparing it with the absolute position which is calculated based on the integration value of the relative shift distance at that time.

<Shift Information Obtained from Images and Sensors>

Figure 20:
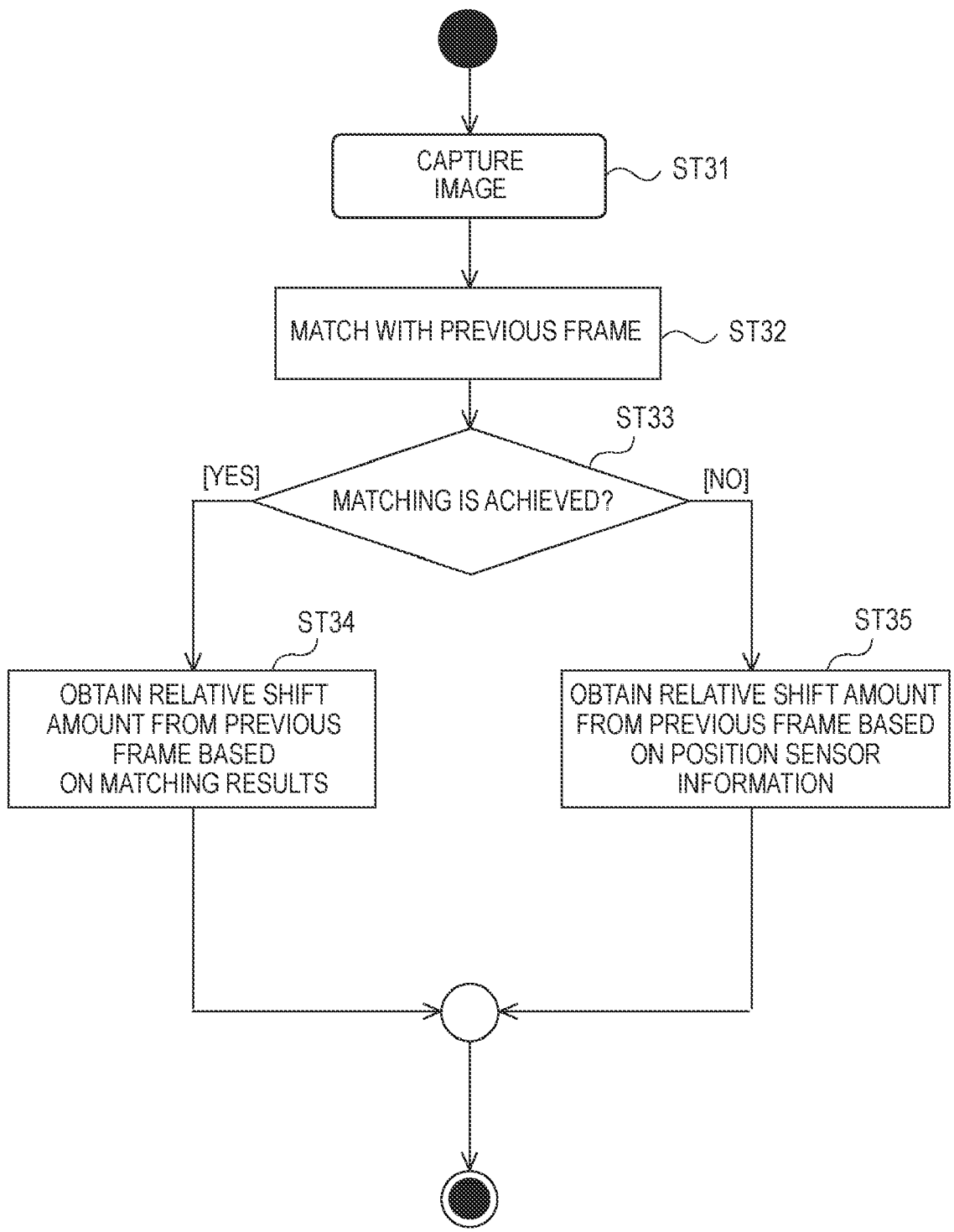
FIG. 20 is a flowchart of a shift amount acquisition method.

FIG. 20 is a flowchart of a shift amount acquisition method.

In the shift amount acquisition method, operations of steps ST31 to ST35 in FIG. 20 are performed.

When the resolution of the angular velocity sensor 142 and the resolution of the shift amount obtained by the image matching are compared, the image matching provides much higher precision values. Therefore, the shift amount calculated from the image matching is used as the relative shift distance (ST33 and ST34) as far as possible.

Since matching is not achieved between images, such as images of the sky of the same color which do not contain high frequency components, in this case, the relative shift amount is calculated by using the output values of the angular velocity sensor 142 (ST33 and ST35).

<Method of Assigning Spatial Coordinates from Imaged Image>

Figure 21:
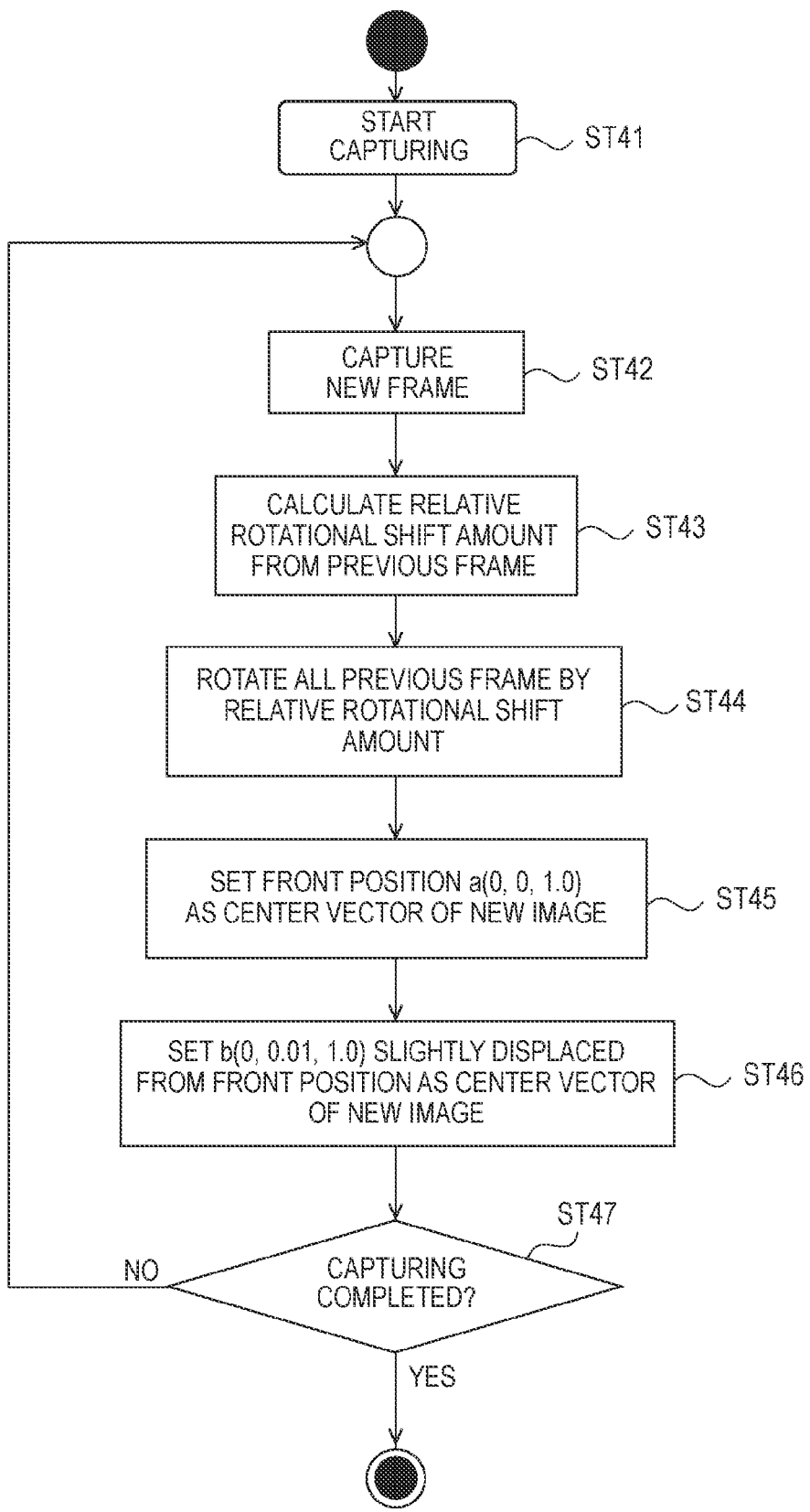
FIG. 21 is a flowchart of a method of assigning spatial coordinates from an imaged image.

FIG. 21 is a flowchart of a method of assigning spatial coordinates from an imaged image.

In the method of assigning the spatial coordinates from the imaged image, operations of steps ST41 to ST47 in FIG. 21 are performed.

With respect to all the panoramic images imaged in the described manner, relative rotational shift amounts from the previous frame, obtained through image matching and the angular velocity sensor can be calculated (ST41 to ST43).

In order to create a panoramic image, it is necessary to assign absolute spatial coordinates to these relative rotational shift amounts.

Since the imaged images have the same angle of view, the coordinates may be assigned with a focus on the central point of the imaged images, namely the orientation vector of the camera.

The relative rotational shift amount from the previous frame can be expressed in terms of an angle of the orientation direction of the camera, namely the shooting viewpoint vector, with respect to the viewpoint vector of the previous frame.

When the arrangement is simplified by only the viewpoint vector, it is difficult to express the rotation around the Z-axis direction of the frame, namely rolling.

Therefore, the rolling of the frame will be expressed by another vector which is displaced on the Y axis right above the frame.

These two vectors express the shooting direction of the camera and the rolling around the Z axis, and the information of the frame is continuously held even after coordinates are rotated.

When the images are arranged in a space, a new frame will always be located at a spatial front position a(0, 0, 1.0).

When the relative rotational shift amount is available, all the previous frames are rotated by that amount in the reverse direction, and then, the spatial front position a(0, 0, 1.0) is arranged (ST44 to ST46).

The relative rotational shift amounts are handled in such a manner that the amounts are calculated not by the difference from the previous frame to the present frame but by the difference from the present frame to the older frames.

A presently imaged frame will be noted as A, and the previously imaged frame will be noted as B.

The relative rotational shift amount is calculated by the difference from the frame A to the frame B (ST43).

When the calculation results show that the camera is rotationally shifted by rx, ry, and rz around the X, Y, and Z axis when calculated from the camera position of the present frame A to the previous frame B, rotation of rx, ry, and rz is applied to the shooting direction vector and the rolling index vector of all the older imaged frames other than the frame A.

The rotation matrix may be a typical three-dimensional space.

Rotation in the Z-axis direction $x2 = x^*\cos(rx) - y^*\sin(rx)$ $y2 = y^*\sin(rx) + z^*\cos(rx)$ $z2 = z$ Rotation in the Y-axis direction $x2 = x^*\cos(ry) - z^*\sin(ry)$ $y2 = y$ $z2 = x^*\sin(ry) + z^*\cos(ry)$ Rotation in the X-axis direction $x2 = x$ $y2 = y^*\cos(rz) - z^*\sin(rz)$ $z2 = y^*\sin(rz) + z^*\cos(rz)$ When the entire frames are rotated in such a manner so that a new frame is arranged at the fixed position, namely the front position, the relative rotational shift amounts can be transferred into the absolute spatial coordinates.

When all the frames are processed, the entire frames will have appropriate absolute coordinates.

However, since the last frame is used as the reference point, there may be a case where an arbitrary frame has to be relatively shifted to the reference point.

Next, the fourth configuration will be described.

[Fourth Configuration]

In the fourth configuration, when the influence of parallax or a moving object is detected, a warning signal is output via the display unit 18 or the speaker unit 20, thereby prompting users to reshoot.

In regard to detection of the moving object, in the fourth configuration, it is made sure that any portion of an object will appear in at least two pieces of images with an overlapping ratio of 50% or more to detect the influence of parallax or the object with the aid of the similarity matching of a motion vector between adjacent images.

In the camera apparatus 10 that images a plurality of strip-shaped images of a wide-range image with a single sweep and combines them into a piece of image, it is detected how much influence of parallax an object in a close range is receiving, and users are prompted to reshoot the object around the viewpoint of the camera based on the detection results.

Since a typical wide-angle camera has its viewpoint right after its lens, it is ideal for a user to hold the camera with the hands to rotate the camera about the wrist of the user.

When images are imaged around the viewpoint of the camera, the images can be combined into one image even when an object in a close range is contained in the images.

Since the camera apparatus 10 according to the present embodiment images a plurality of strip-shaped images, the camera apparatus 10 has an advantage that even when images are imaged around a position slightly displaced from the viewpoint of the camera, an influence thereof is not likely to appear.

However, when images are imaged with the camera held by the hands and rotated about the shoulder, the camera will be rotated about a position far backward from the viewpoint of the camera, and thus, a resulting image will be strongly influenced by parallax.

Although there is substantially no problem when the scene has all objects located in the far range, if an object in the close range is contained in the scene, the positional relationship with adjacent images cannot be correctly combined unlike objects in the far range.

Therefore, in the fourth configuration, when it is detected that it is unable to correctly combine images due to the influence of parallax, users are prompted to reshoot by being instructed to rotate the camera about the viewpoint of the camera.

[Parallax Detection Method]

The parallax detection method will be described.

A block matching is performed a plurality of times within an overlapping range of two pieces of images adjacent in time to calculate resulting motion vectors.

Generally, if the camera is properly swept, the BM results will produce approximately identical vectors.

When the camera is rotated about the shoulder and an object in the close range is contained in the scene in the far range, the resulting vectors will have different values.

Since changes in the image are severe at the boundaries of an object in a close range and an object in a far range, it is difficult to obtain a correct BM result. The parallax is detected by this method.

A specific processing example of the parallax detection will be described below.

The following processing is performed by the microcomputer 162 and the image signal processing section 161 of the system controller 16 in a collaborative manner.

<Parallax Detection Method>

[Rough Combining]

The camera apparatus 10 is rotated from left to right and several ten pieces of images corresponding to a range of about 120 degrees are imaged.

It is made sure that there is a sufficient region (overlapping region) in which a same object appears in adjacent images.

The motion of the camera apparatus 10 during the shooting is detected by the position sensor 14 and recorded at very small intervals of time.

Since the sensor data are recorded in synchronism with the imaged images, it is possible to know the shooting directions of respective images; however the precision of the data is not high.

The respective images are arranged on a longitude-altitude plane based on this information.

In this state, each of the overlapping regions of the adjacent images contains about 100 pixels and is arranged at an approximately correct position.

From this point, the processing of a precise automated combining routine is performed.

[Precise Automated Combining]

A motion detection (ME; motion search or motion estimation) is performed in a plurality of areas within the overlapping region.

In the motion detection ME, a FFT-based phase-only correction method is used. Alternatively, a characteristic point extraction method or other method may be used.

In the case where there is only a translation, only one ME area will suffice.

Two ME areas can give mutual inclination information.

Three ME areas can give a lens distortion coefficient.

The number of ME areas may be small if there is no moving object in the overlapping region and the influence of hand shaking is not detected in the background.

However, if the number of ME areas is too small, it is difficult to cope with such a case where a moving object is contained in the overlapping region or the influence of parallax is detected in a close range.

Therefore, the ME is performed in as many areas as possible in the overlapping region.

When many motion vectors obtained as the results of the ME have substantially the same values, the images can be combined by translating one of the images relative with the others.

Although the motion vectors do not have substantially the same values, if the values change uniformly from the upper one to the lower one, the images can be combined by inclining one of the images relative with the others.

However, when different ME results are obtained from the overlapping region, it is practically not possible to combine the images together.

This is because a moving object is present or because the images are imaged with the viewpoint shifted due to coexistence of objects in the close and far ranges.

[Method of ME]

First, the ME is performed roughly by reducing the image subjected to the ME.

The reduction ratio is gradually decreased, and finally, the ME is performed with the image of the actual size.

The block size of the ME is changed or the center-to-center distance of the blocks is decreased so that more detailed motion vectors can be acquired.

[Evaluation of ME Result]

A determination is made based on many results of the ME as to whether or not stitching can be performed correctly, and if determined not to be possible, such a determination result is displayed to prompt users to reshoot.

If determined to be possible, the stitching is performed, and the result of the combining is displayed and recorded in a recording medium (memory).

[Behavior of Moving Object]

Next, the behavior of a moving object will be described.

A block matching (BM) is performed a plurality of times within an overlapping range of two pieces of images adjacent in time to calculate resulting motion vectors.

This vector corresponds to a moving direction and thus can be separated from a stationary part.

Since changes in the image are severe at the boundaries of a moving object and a stationary object, it is difficult to obtain a correct BM result. When the camera is swept in the horizontal direction, it is difficult to differentiate a case where parallax occurs due to presence of a stationary object in a close range and a case where there is an object moving in the horizontal direction.

Therefore, in such a case, a warning signal is output without differentiating the parallax and the moving object.

When the parallax or the moving object is detected in the images, it is practically not possible for the existing technique to stitch the images without producing any discomfort to users.

Therefore, in the present embodiment, a warning signal is output to prompt users to "reshoot" or "reshoot with changed shooting method."

For example, a warning signal is output such as "The influence of parallax or moving objects appeared in the image. Please reshoot with a reduced radius of rotation."

As described above, in the fourth configuration, since the presence of moving objects can be detected right after the shooting, it is possible to do reshooting.

As a result, since the influence of parallax can be detected right after the shooting, it is possible to do reshooting.

Next, the fifth configuration will be described.

[Fifth Configuration]

In the fifth configuration, an appropriate value of the sweeping angular velocity (the speed at which the user sweeps the camera) is notified to users and a warning signal is output if the sweeping is too fast, thereby prompting the users to reshoot.

As described above, the microcomputer 162 graphically displays time and output (sweeping angular velocity) of a position sensor (gyro sensor), respectively, on the horizontal and vertical axes of a screen of a display unit 18, e.g., an LCD.

Since the maximum sweeping angular velocity is determined when a horizontal angle of view, a horizontal pixel number, and a shutter speed are set, a 60 to 80% of the maximum sweeping angular velocity is displayed on the graph as an appropriate range RNG as shown in FIG. 4.

An overview of the operation procedures is as follows.

[1] The camera is swept with the pressed start button of the operation unit 19 and then the start button is released.

[2] The sweeping angular velocity during the pressed state of the start button is displayed on the screen of the display unit 18 as illustrated in FIG. 4.

[3] The warning signal is not output when the sweeping angular velocity is lower than the appropriate range RNG, but will be output when the sweeping angular velocity is higher than the appropriate range.

As described above, in the fifth configuration, since users are informed of the appropriate velocity, it is possible to eliminate inconveniences such that too fast sweeping results in no overlapping regions and too slow sweeping results in imaging of a narrow scene.

An example of the processing for calculating the sweeping velocity will be described with reference to FIGS. 22A to 22D.

<Calculation of Sweeping Velocity>

A method will be described for calculating such a sweeping velocity as to eliminating any problems in a blurring angle, a blurring pixel count when an exposure period, a pixel count, a readout period per one line, an angle of view, an overlapping ratio, and a frame rate are determined.

The lowest value of the sweeping velocities obtainable from three formulas is the maximum angular velocity under that condition.

The tables shown in FIGS. 22A to 22D show the calculation results of the blurring pixel count and the frame rate when various parameters are given, such as, for example, an angle of view and a sweeping velocity.

The calculation results are obtained under different conditions [1] to [6].

The calculation results under the condition [1] in FIGS. 22A to 22D will be described below.

The blurring angle ab2, the burring pixel count nb2, and the frame rate f are calculated as below from the calculation formulas on the right of the table in FIGS. 22A to 22D using the sweeping velocity vp, the angle of view th, the horizontal pixel count H, and the overlapping ratio k.

$$ab2 = vp \cdot (ts + n \cdot rs) \cdot 1000$$

$$nb2 = vp \cdot (ts + n \cdot rs) \cdot H/th$$

$$f = 100/(100-k) \cdot H \cdot vp/n/th$$

From these equations, the sweeping velocity vp becomes as follows.

$$vp = 1000 \cdot ab2/(ts + n \cdot rs) [\text{deg}] \quad (1)$$

$$vp = nb2 \cdot th/H/(ts + n \cdot rs) [\text{deg/sec}] \quad (2)$$

$$vp = (100-k)/100 \cdot n \cdot th \cdot f/H \quad (3)$$

Here, when the blurring angle ab2 is 0.28 degrees, the exposure period is 1 msec, the shorter-side pixel count n is 400 pixels, and the readout period per one line rs is 7.8 μsec, the sweeping velocity vp becomes 68 deg/sec.

Moreover, when the blurring pixel count nb2 is 19.9 pixels, the longer-side angle of view th is 50 degrees, and the horizontal pixel count H is 3560 pixels, the sweeping velocity vp becomes 68 deg/sec.

Furthermore, when the overlapping rate k is 20% and the frame rate f is 15.13, the sweeping velocity vp becomes 68 deg/sec.

Therefore, when the parameters on the right sides of the formulas (1), (2), and (3) are changed, the sweeping velocity will be restricted by the formulas.

When the camera is swept faster than the sweeping velocity vp obtained by the formula (1), it may exceed the operation limit of an optical image stabilization element.

When the camera is swept faster than the sweeping velocity vp obtained by the formula (2), the blurring amount may exceed an allowable limit.

When the camera is swept faster than the sweeping velocity vp obtained by the formula (3), the overlapping range will decrease, and even will disappear in some cases.

The first to fifth configurations described in detail hereinabove may be solely or entirely employed in the camera apparatus 10, and may be appropriately combined together to be employed therein.

The methods described in detail hereinabove may be implemented as programs corresponding to the above-mentioned procedures to be executed by a computer such as a CPU.

Such programs may be accessed via a recording medium such as a semiconductor memory, a magnetic disc, an optical disc or a floppy (the registered trademark) disc, or by a computer having such recording medium set therein, whereby the programs are executed.

The present application contains subject matter related to that disclosed in Japanese Priority Patent Application JP 2008-312705 filed in the Japan Patent Office on Dec. 8, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus for capturing multiple object images that are subject to be combined to generate a panoramic image, comprising: a Complimentary Metal Oxide Semiconductor (CMOS) image sensor configured to image the multiple object images while the imaging apparatus is being moved in a direction perpendicular to readout lines of the CMOS image sensor;
a controller configured to perform optical axis control with respect to a predetermined shape of a segment corresponding to a plurality of readout lines of the CMOS image sensor for each of the multiple object images so that the optical axis is changed in a direction for negating the movement of the imaging apparatus during a first period when the predetermined shape of the segment of the CMOS image sensor is exposed, the optical axis returning to a vicinity of approximately a center of the movement during a second period other than the first period,
wherein,
portions of each of the multiple object images corresponding to the predetermined shape of the segment of the CMOS image sensor are subject to be combined so as to generate the panoramic image.

2. The imaging apparatus according to claim 1, wherein a shooting direction is perpendicular to the line of the imaging device.

3. The imaging apparatus according to claim 1,
wherein the controller performs the optical axis control during a period which corresponds to the sum of an exposure period and a readout period of the segment and performs the control for returning the optical axis to the vicinity of the center of the movement during periods other than the corresponding period.

4. The imaging apparatus according to claim 3, wherein
the controller segments a portion of the imaging device into a strip shape and performs the optical axis control with respect to the strip-shaped portion;
the CMOS image sensor performs a charge readout process with respect to all strip-shaped portions, where a charge readout is performed in the line subsequently to exposure and a charge readout of a subsequent line is performed after the readout of the line is completed; and
the controller performs the optical axis control during periods when the charge readout process is performed with respect to all the strip-shaped portions.

5. The imaging apparatus according to claim 1, further comprising an angular velocity sensor,
wherein the controller integrates a detection signal to calculate a rotation angle of the imaging apparatus and controls an amount of change in the optical axis in accordance with the calculated rotation angle.

6. The imaging apparatus according to claim 1,
wherein an image signal processing section extracts a certain parameter by performing block matching processes at boundaries of a plurality of selected images to perform combining processes with respect to the boundaries so that the boundaries of the selected images are disposed in an overlapping relationship, performs the block matching processes with respect to all boundaries to be combined based on the parameter; evaluates the results of the block matching processes with respect to all the boundaries in a simultaneous and parallel manner; and performs the combining processes to reduce errors by updating an optical axis direction so as to reduce errors in all the boundaries.

7. The imaging apparatus according to claim 1, wherein the predetermined shape of the segment corresponding to the plurality of readout lines of the CMOS image sensor is a strip shape.

8. An imaging method for capturing multiple object images that are subject to be combined to generate a panoramic image, comprising the steps of:

imaging the multiple object images while an imaging apparatus is being moved in a direction perpendicular to readout lines of a Complimentary Metal Oxide Semiconductor (CMOS) image sensor; and performing optical axis control with respect to a predetermined shape of a segment corresponding to a plurality of readout lines of the CMOS image sensor for each of the multiple object images so that the optical axis is changed in a direction for negating the movement of the imaging apparatus during a first period when the predetermined shape of the segment of the CMOS image sensor is exposed, the optical axis returning to a vicinity of approximately a center of the movement during a second period other than the first period, wherein, portions of each of the multiple object images corresponding to the predetermined shape of the segment of the CMOS image sensor are subject to be combined so as to generate the panoramic image.

9. The imaging method according to claim 8, wherein a shooting direction is perpendicular to the line of the CMOS image sensor.

10. The imaging method according to claim 8, wherein the optical axis control is performed during a period which corresponds to the sum of an exposure period and a readout period of the segment, and the control for returning the optical axis to the vicinity of the center of the movement is performed during periods other than the corresponding period.

11. The imaging method according to claim 8, wherein the predetermined shape of the segment corresponding to the plurality of readout lines of the CMOS image sensor is a strip shape.

12. A non-transitory computer readable medium having stored thereon computer executable instructions for capturing multiple object images that are subject to be combined to generate a panoramic image, the instructions comprising:

imaging the multiple object images while an imaging apparatus is being moved in a direction perpendicular to readout lines of a Complimentary Metal Oxide Semiconductor (CMOS) image sensor; and performing optical axis control with respect to a predetermined shape of a segment corresponding to a plurality of readout lines of the CMOS image sensor for each of the multiple object images so that the optical axis is changed in a direction for negating the movement of the imaging apparatus during a first period when the predetermined shape of the segment of the CMOS image sensor is exposed, the optical axis returning to a vicinity of approximately a center of the movement during a second period other than the first period, wherein, portions of each of the multiple object images corresponding to the predetermined shape of the segment of the CMOS image sensor are subject to be combined so as to generate the panoramic image.

\* \* \* \* \*